United States Patent
Itasaki et al.

(10) Patent No.: US 8,130,109 B2
(45) Date of Patent: Mar. 6, 2012

(54) INFORMATION ACCESSING SYSTEM, INFORMATION APPARATUS, RECORDING MEDIUM AND METHOD FOR ACCESSING INFORMATION

(75) Inventors: Akira Itasaki, Kawasaki (JP); Isamu Yamada, Kawasaki (JP); Shinichi Shiotsu, Kawasaki (JP); Satoshi Inano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 577 days.

(21) Appl. No.: 12/350,548

(22) Filed: Jan. 8, 2009

(65) Prior Publication Data
US 2009/0179762 A1 Jul. 16, 2009

(30) Foreign Application Priority Data
Jan. 11, 2008 (JP) ................................. 2008-004362

(51) Int. Cl.
*G08B 21/00* (2006.01)
(52) U.S. Cl. ................... 340/635; 340/572.1; 340/10.51
(58) Field of Classification Search .................. 340/635, 340/572.1, 572.2, 505, 572.4, 10.1, 10.51; 235/385
See application file for complete search history.

(56) References Cited

U.S. PATENT DOCUMENTS

| 6,922,402 | B1 | 7/2005 | Ko | |
|---|---|---|---|---|
| 7,145,458 | B2 * | 12/2006 | Hashimoto et al. | 340/572.1 |
| 7,536,152 | B2 * | 5/2009 | Inano et al. | 340/10.2 |
| 7,710,242 | B2 * | 5/2010 | Yamada et al. | 340/10.51 |
| 7,821,397 | B2 * | 10/2010 | Itasaki et al. | 340/572.1 |
| 2008/0005259 | A1 * | 1/2008 | Inano et al. | 709/212 |

FOREIGN PATENT DOCUMENTS

| JP | 2000-113130 A | 4/2000 |
|---|---|---|
| JP | 2001-251210 A | 9/2001 |
| JP | 2006-72727 A | 3/2006 |

* cited by examiner

*Primary Examiner* — John A Tweel, Jr.
(74) *Attorney, Agent, or Firm* — Fujitsu Patent Center

(57) ABSTRACT

A method, to facilitate communication by a machine, includes: receiving data transmitted from a reading/writing apparatus; detecting a data request signal; transmitting, to the reading/writing apparatus, a response signal responsive to the data request signal; acquiring, from a sensor, detected data indicative of at least one of a physical quantity and a physical state; storing the acquired detected data into a memory and setting thereafter a flag to a first state; transmitting the acquired detected data if the data request signal is detected and setting thereafter the flag to a second state; invoking an alarm if the flag is in the first state and a power switch is in an OFF state; and controlling the power switch to disconnect power from the power supply to the information apparatus if the flag is in the second state and the power switch is in the OFF state.

19 Claims, 30 Drawing Sheets

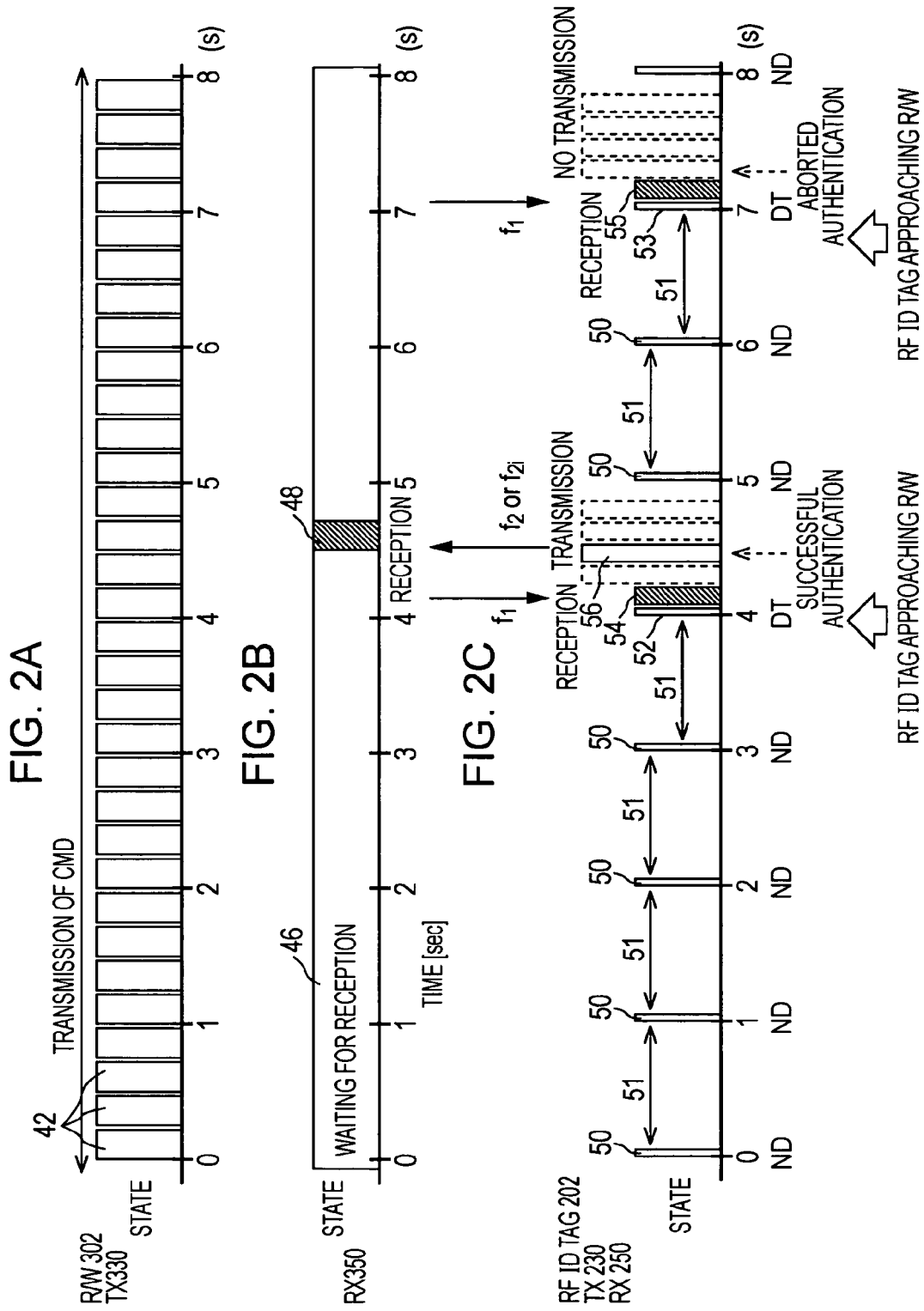

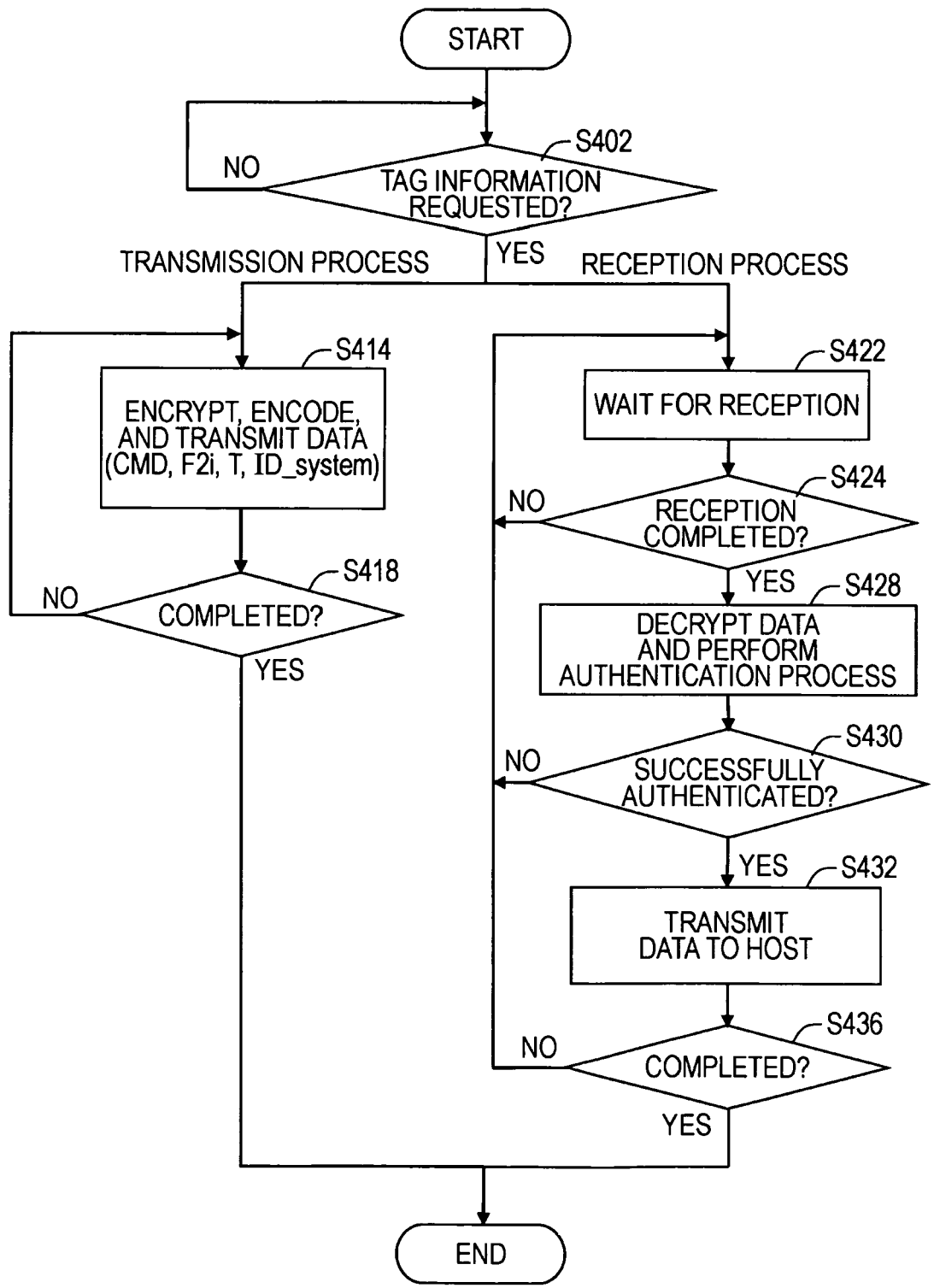

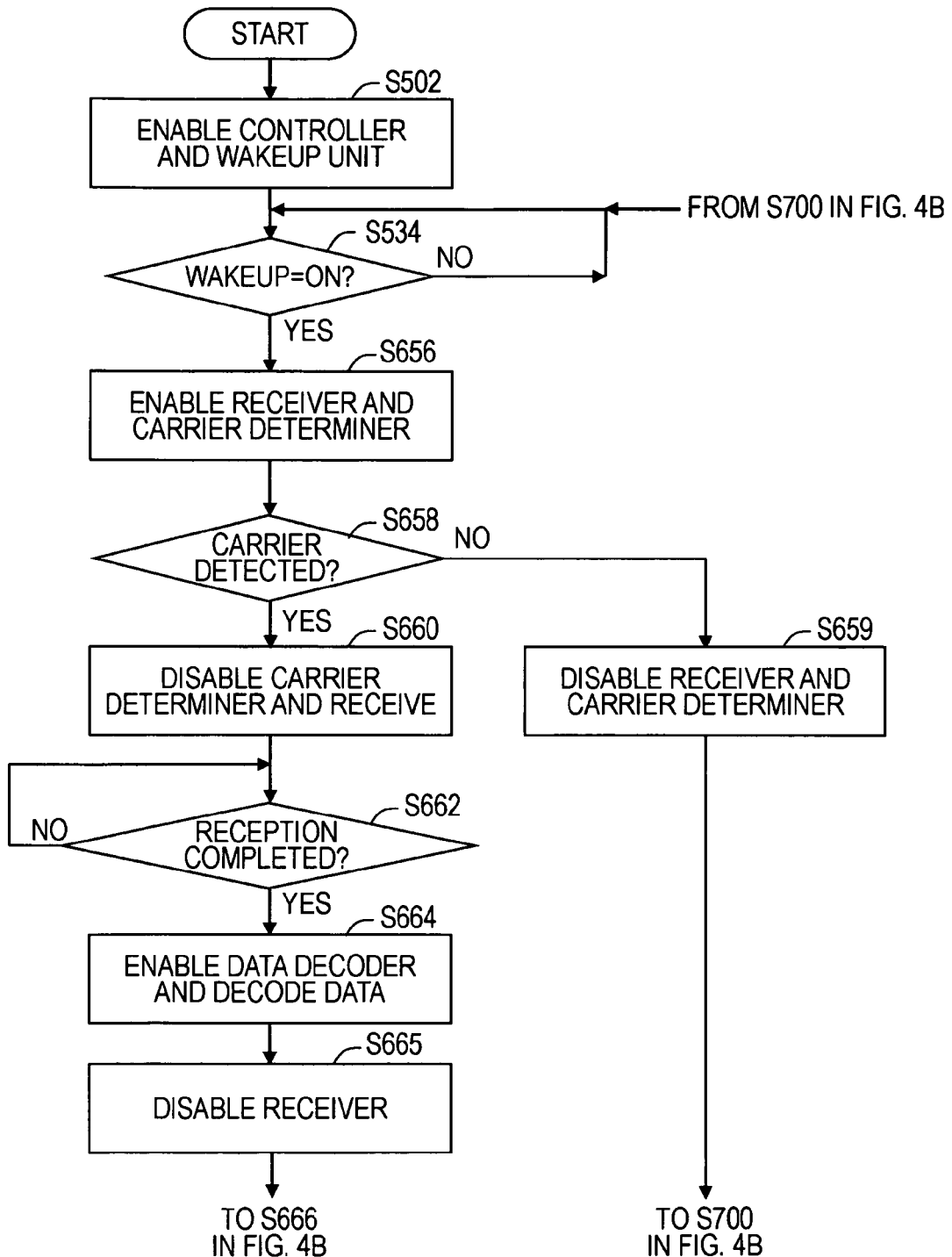

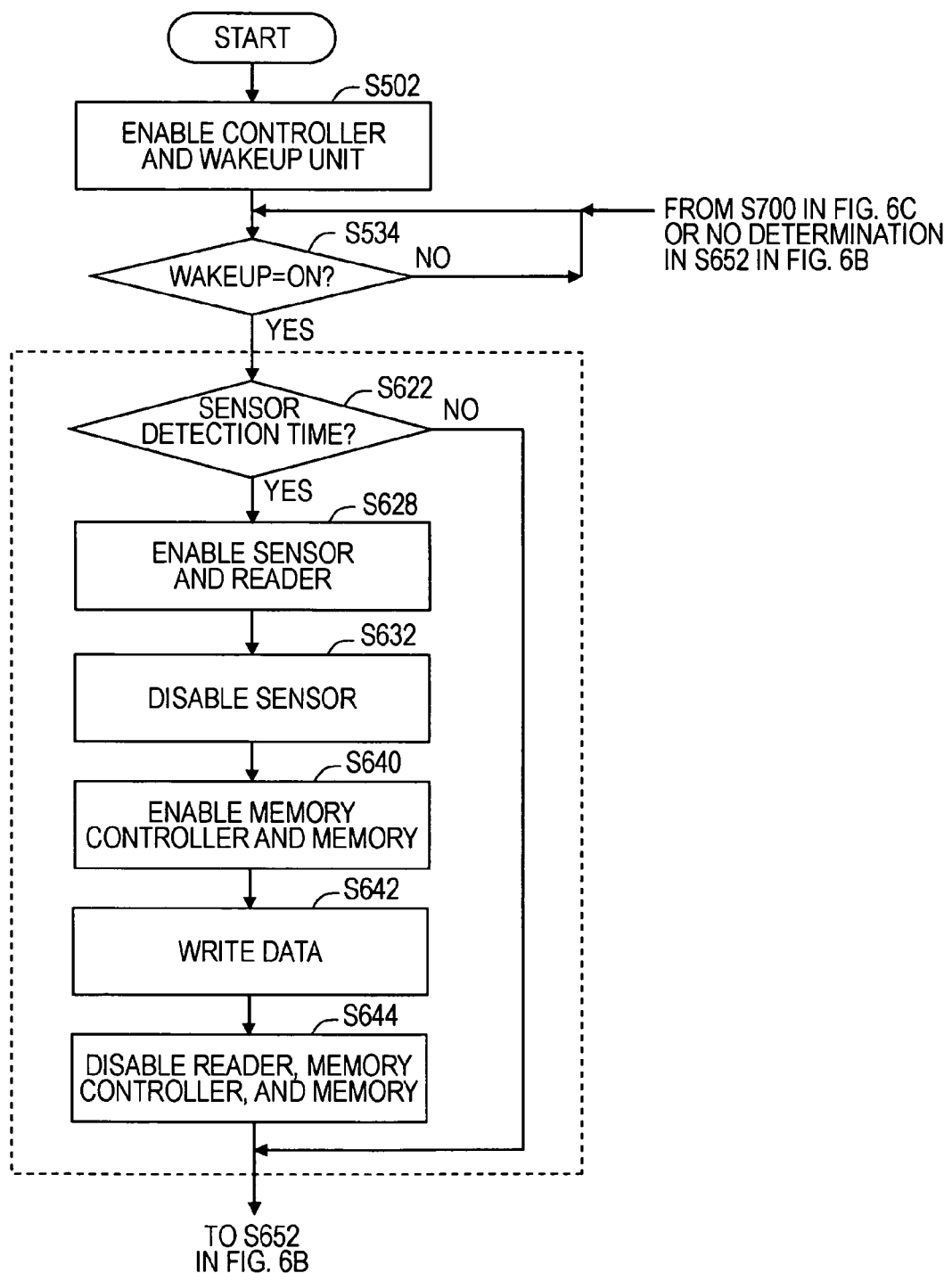

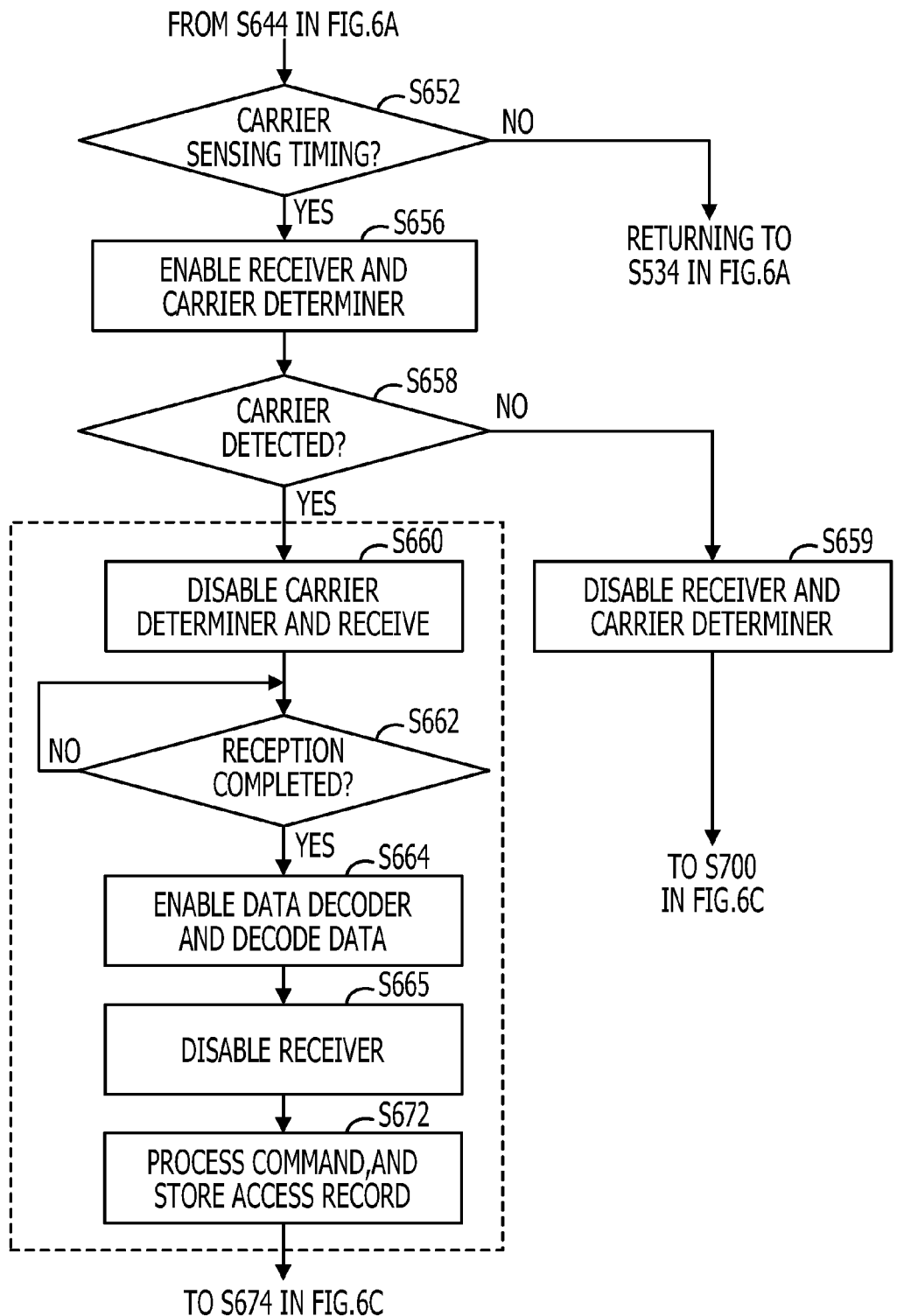

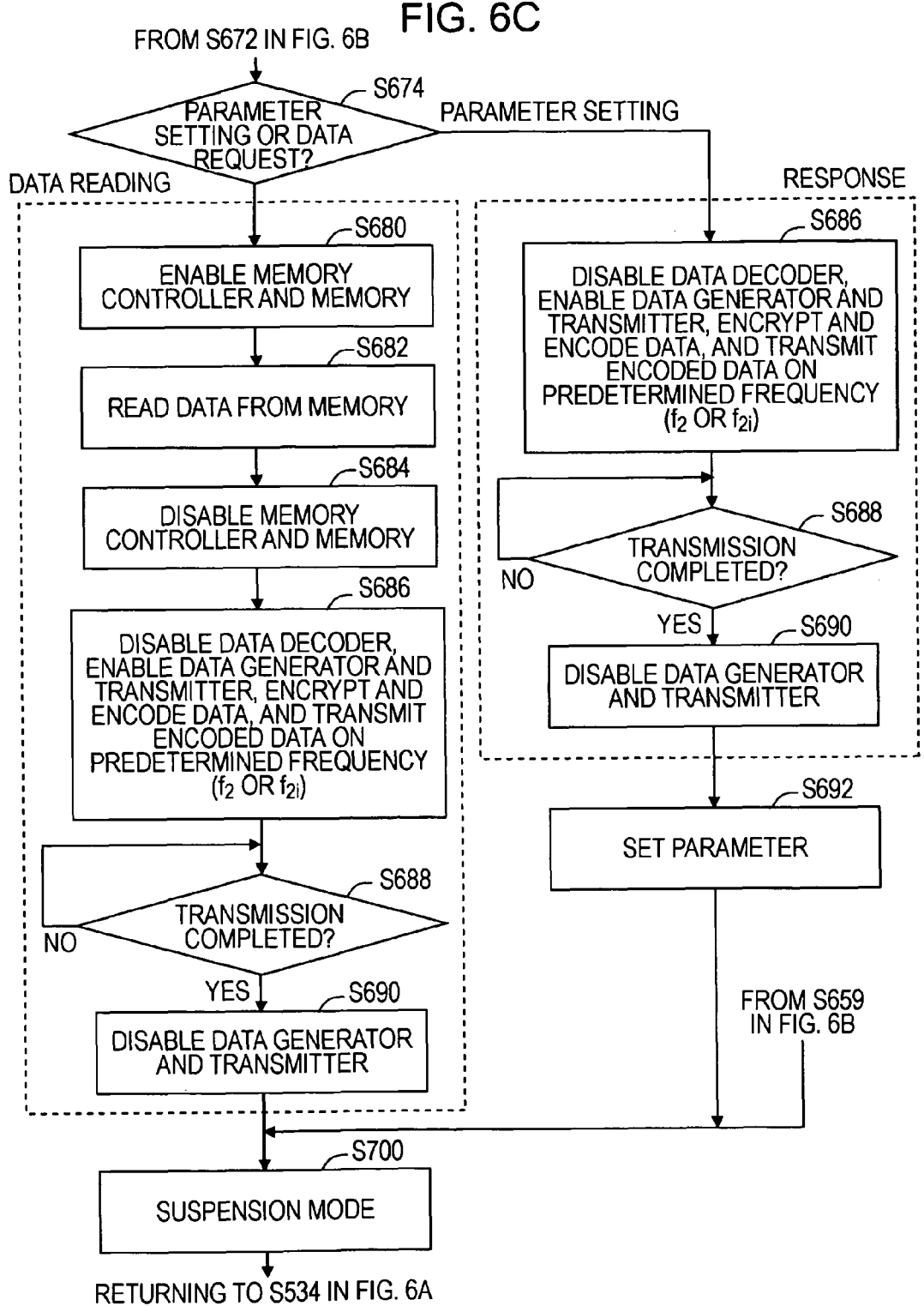

FIG. 8A

| START BYTE (1 BYTE) | ID REQUEST COMMAND (1 BYTE) | DATA LENGTH (1 BYTE) | DATA | END BYTE (1 BYTE) | CHECK BYTE (1 BYTE) |

FIG. 8B

| START BYTE (1 BYTE) | READ REQUEST COMMAND (1 BYTE) | DATA LENGTH (1 BYTE) | DATA | END BYTE (1 BYTE) | CHECK BYTE (1 BYTE) |

FIG. 8C

| START BYTE (1 BYTE) | FLAG SET REQUEST COMMAND (1 BYTE) | DATA LENGTH (1 BYTE) | FLAG VALUE (1 BYTE) | DATA | END BYTE (1 BYTE) | CHECK BYTE (1 BYTE) |

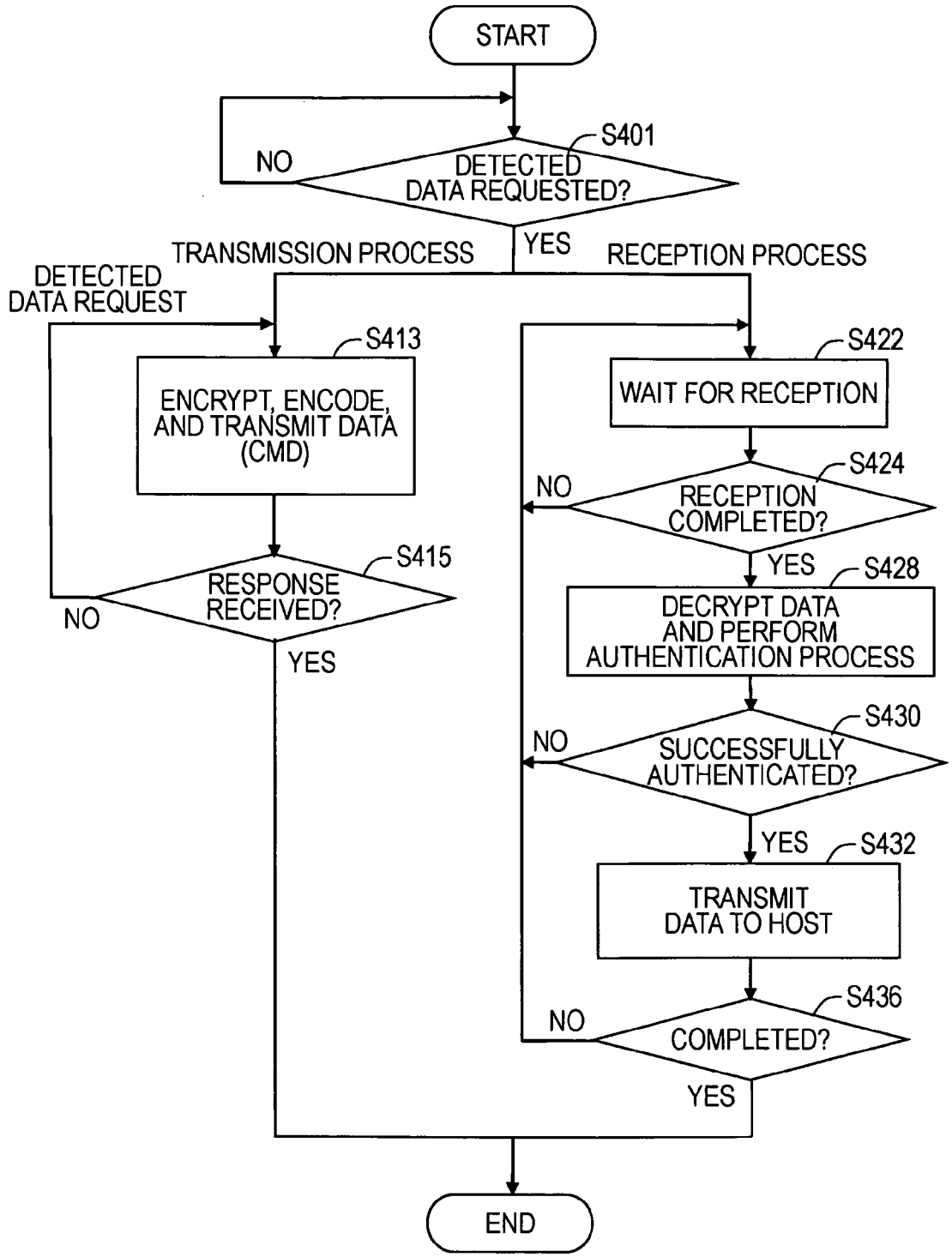

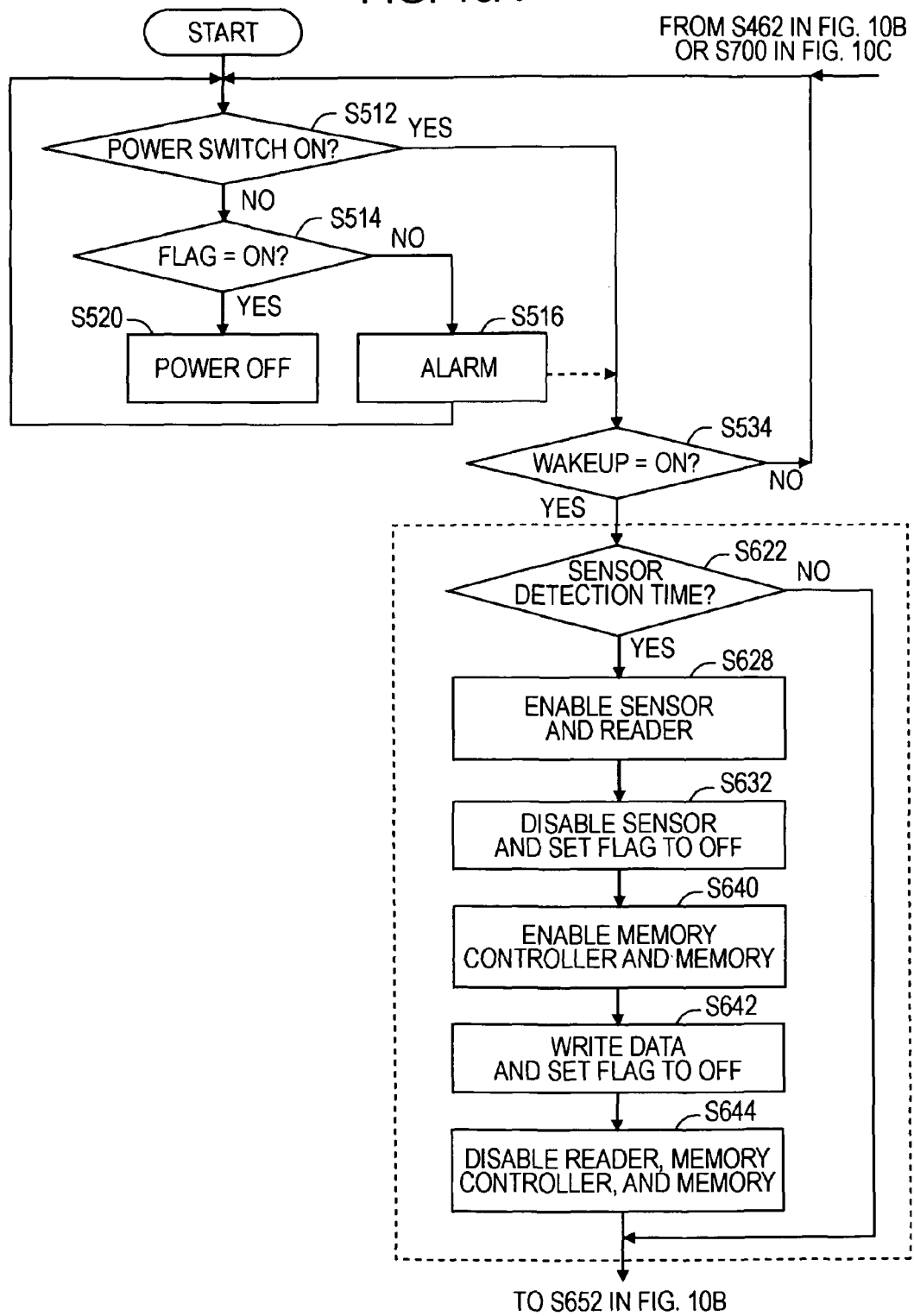

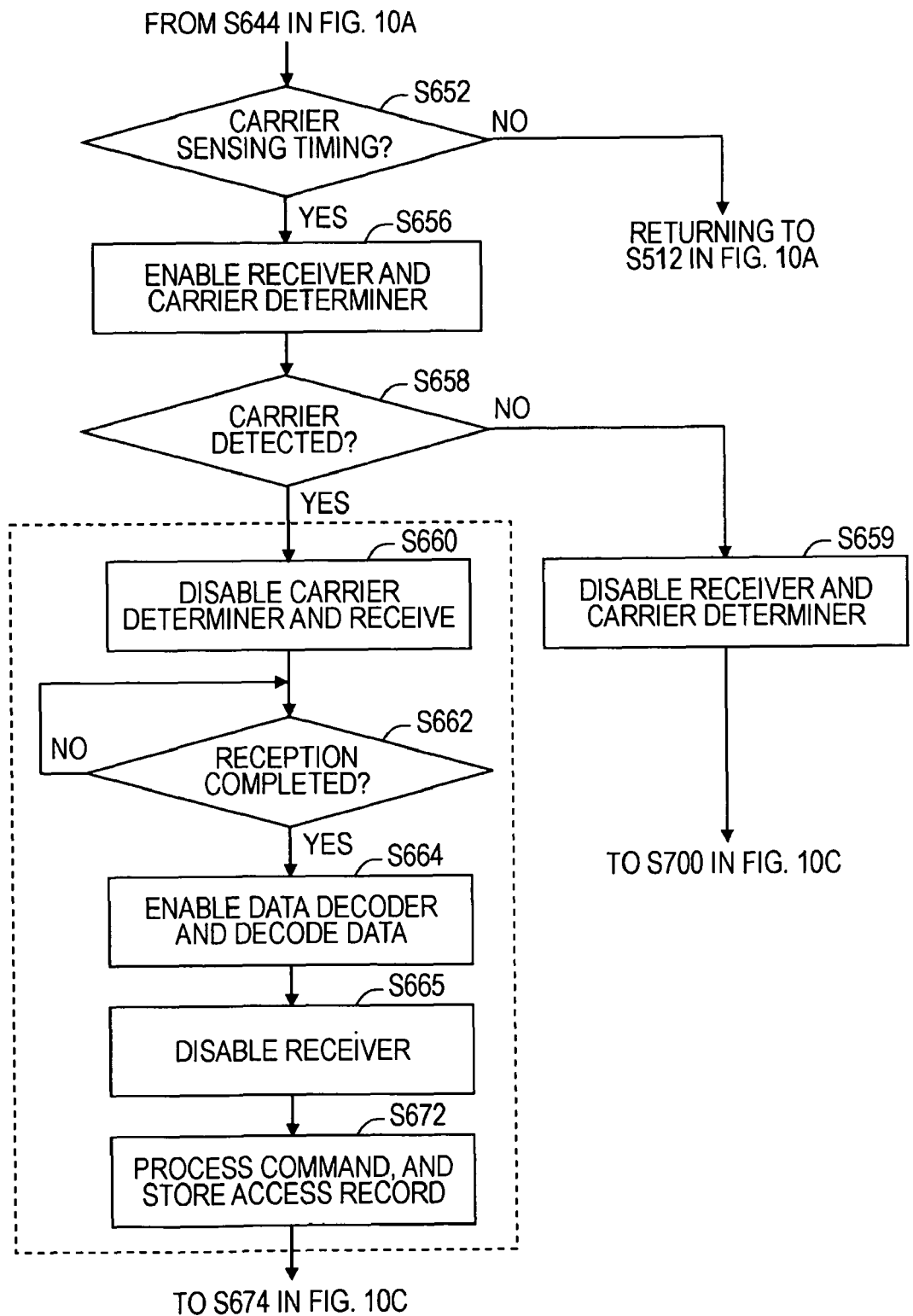

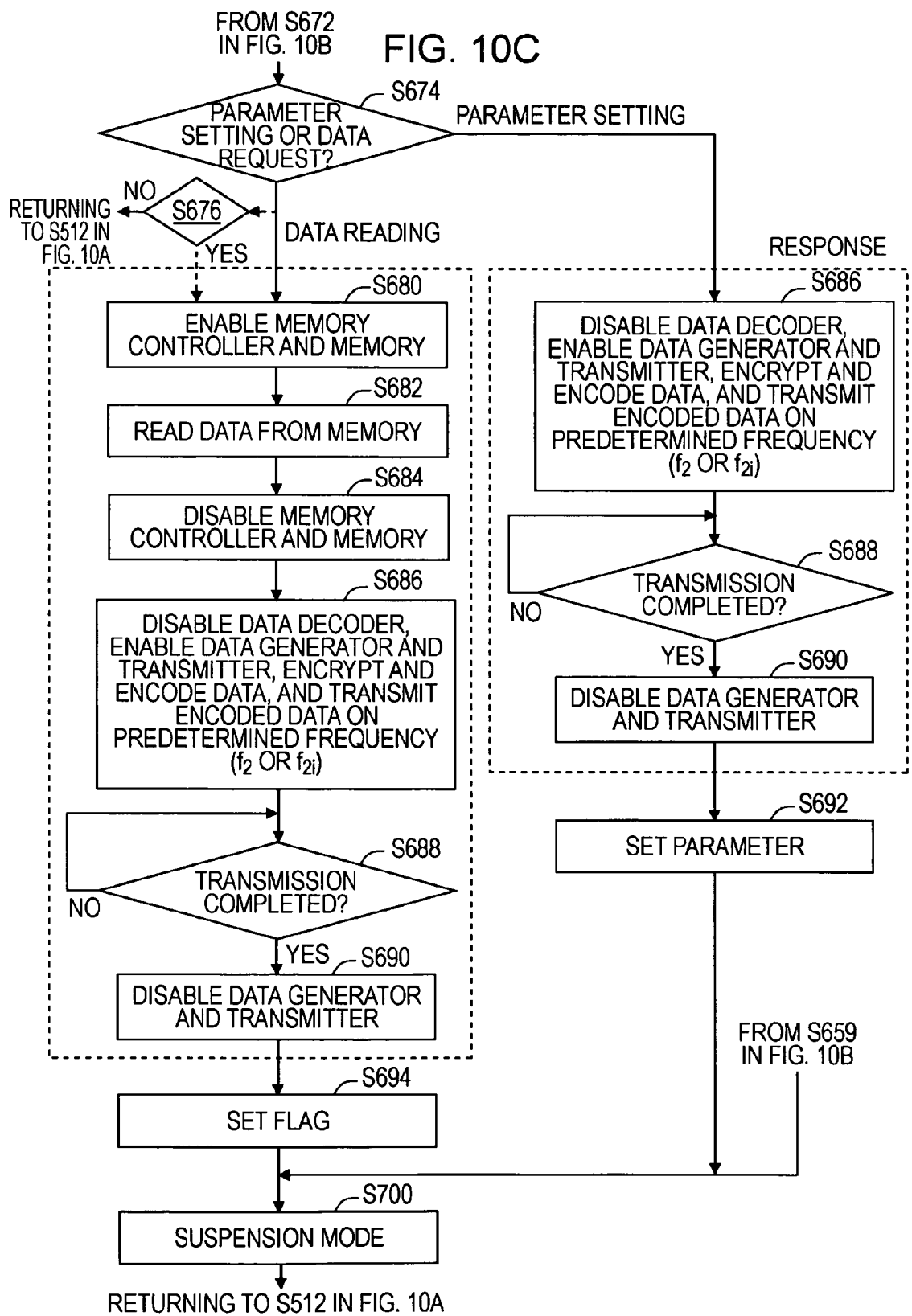

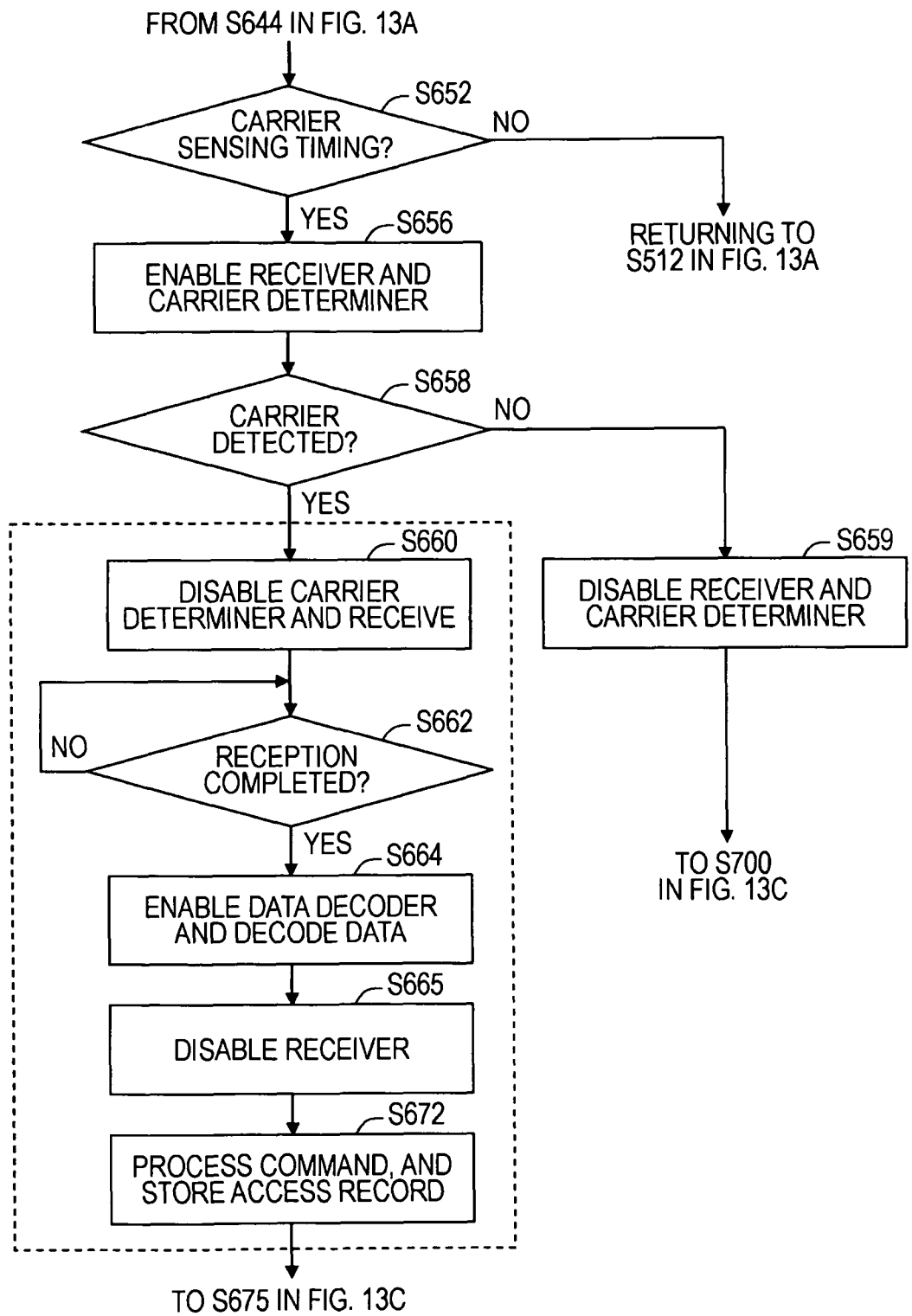

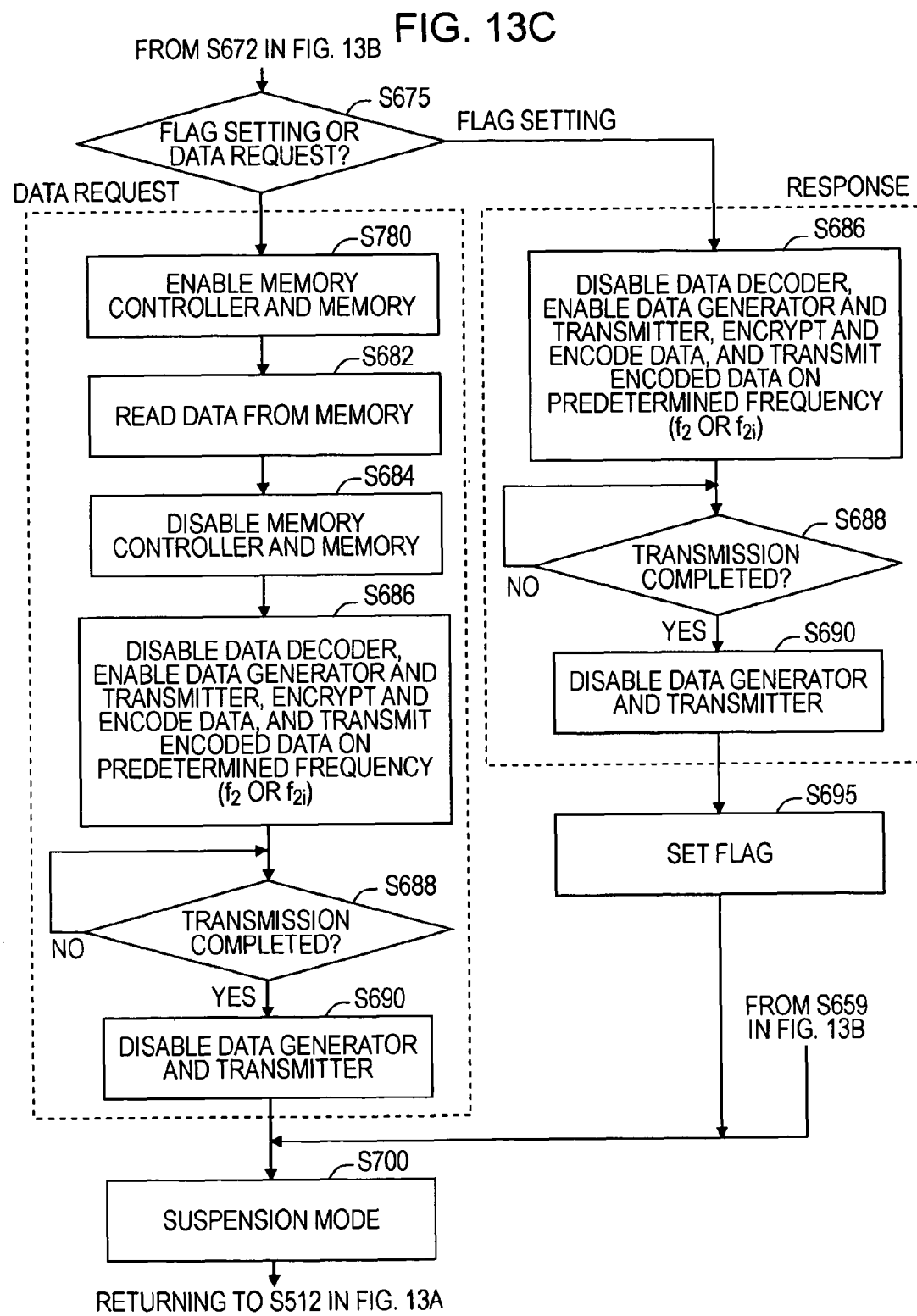

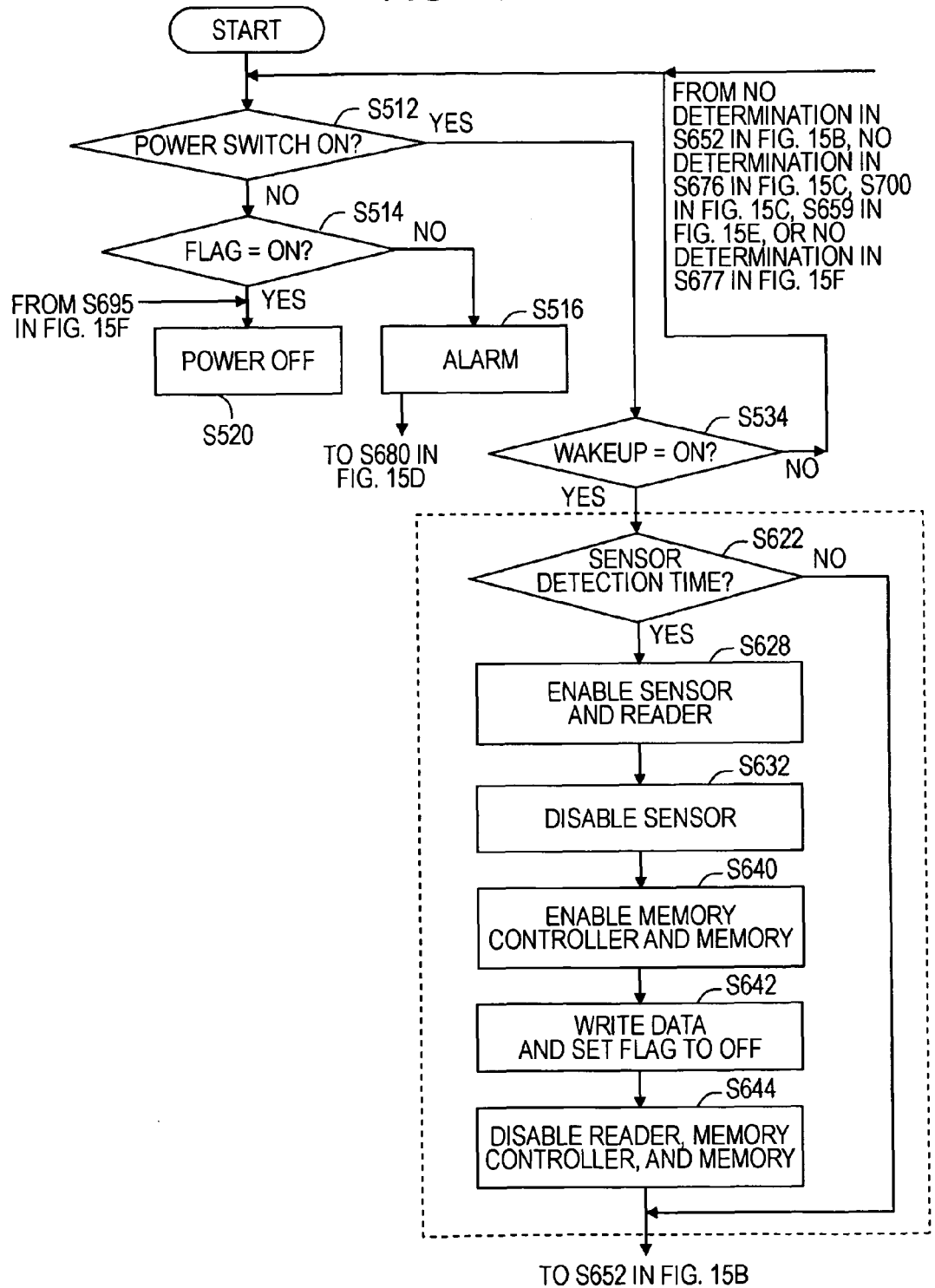

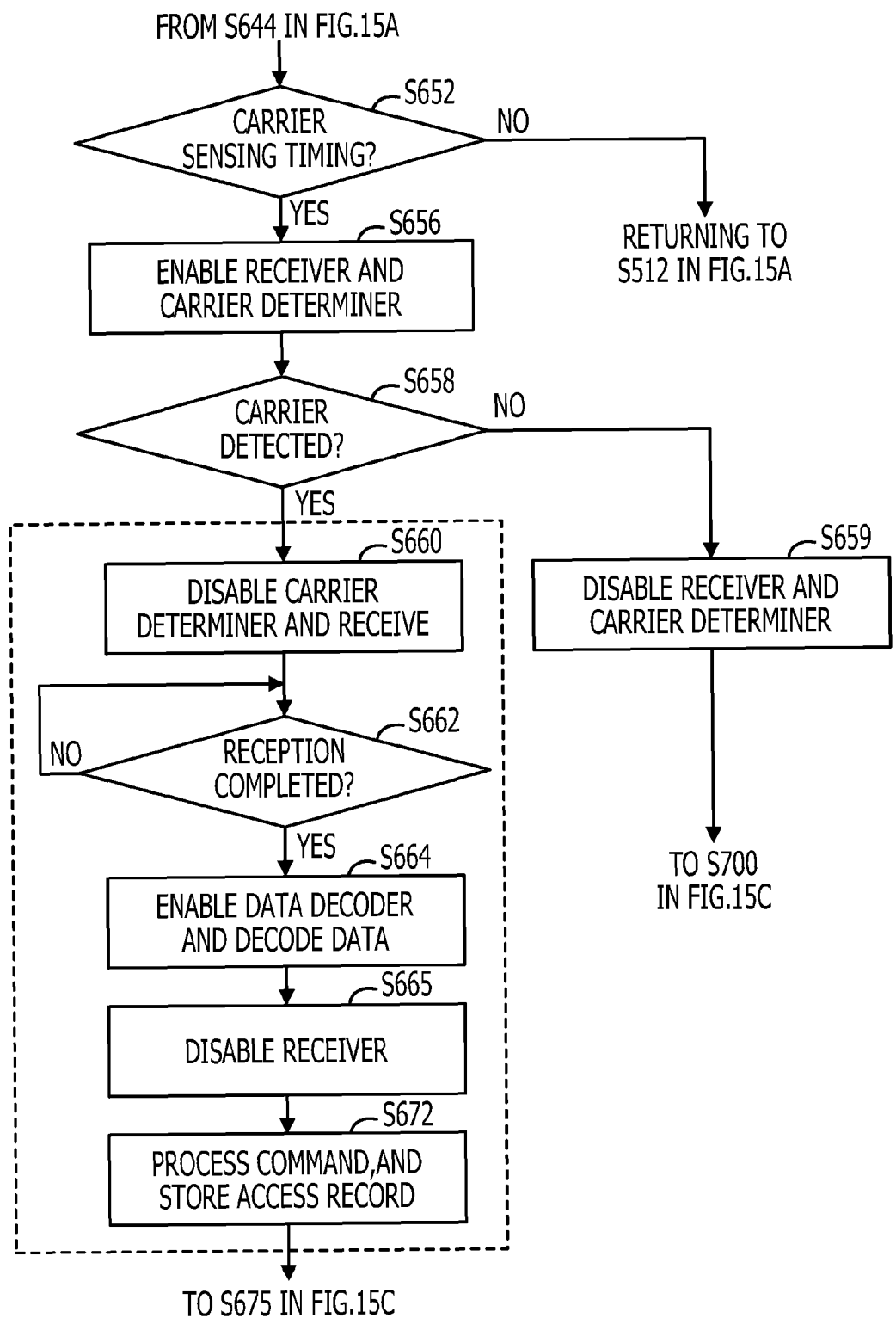

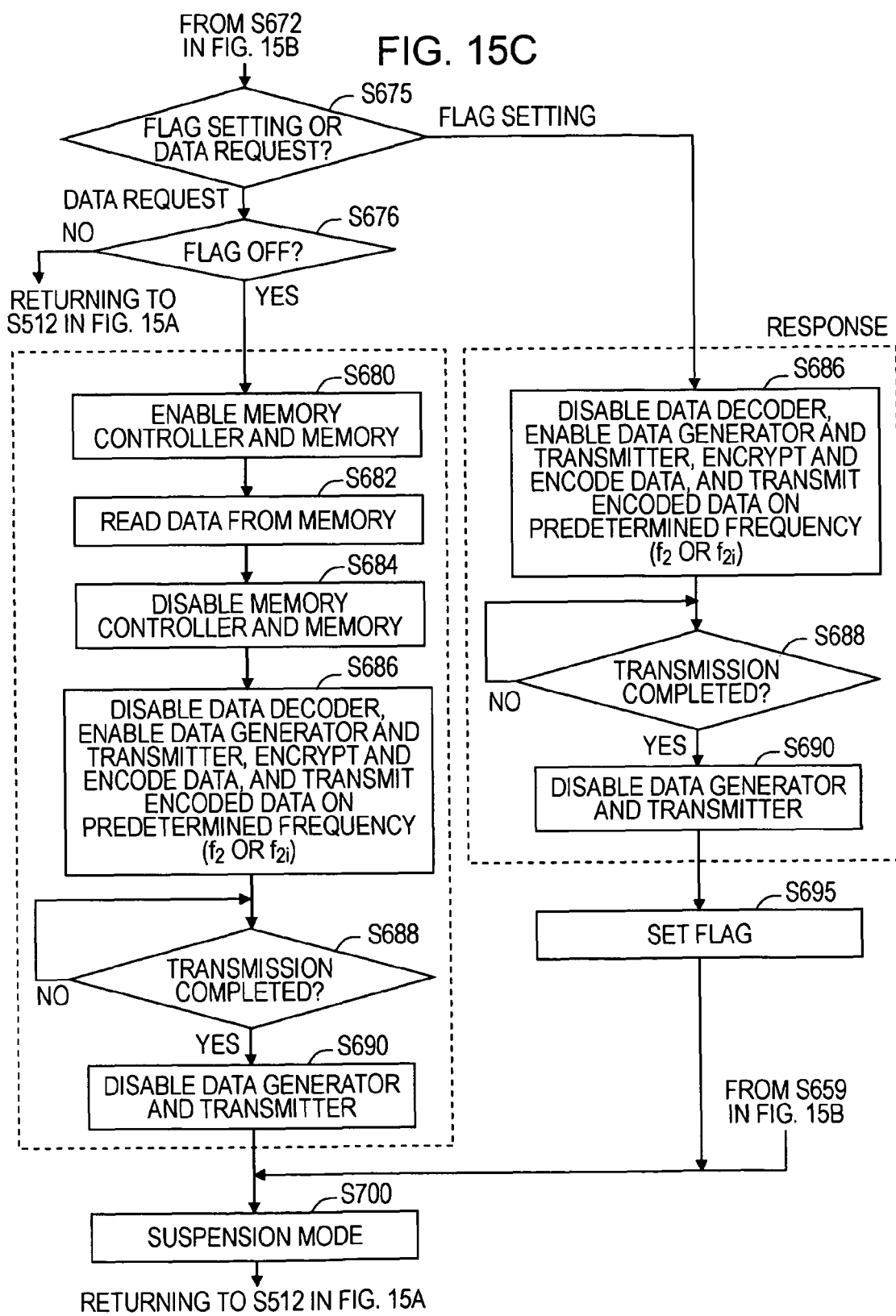

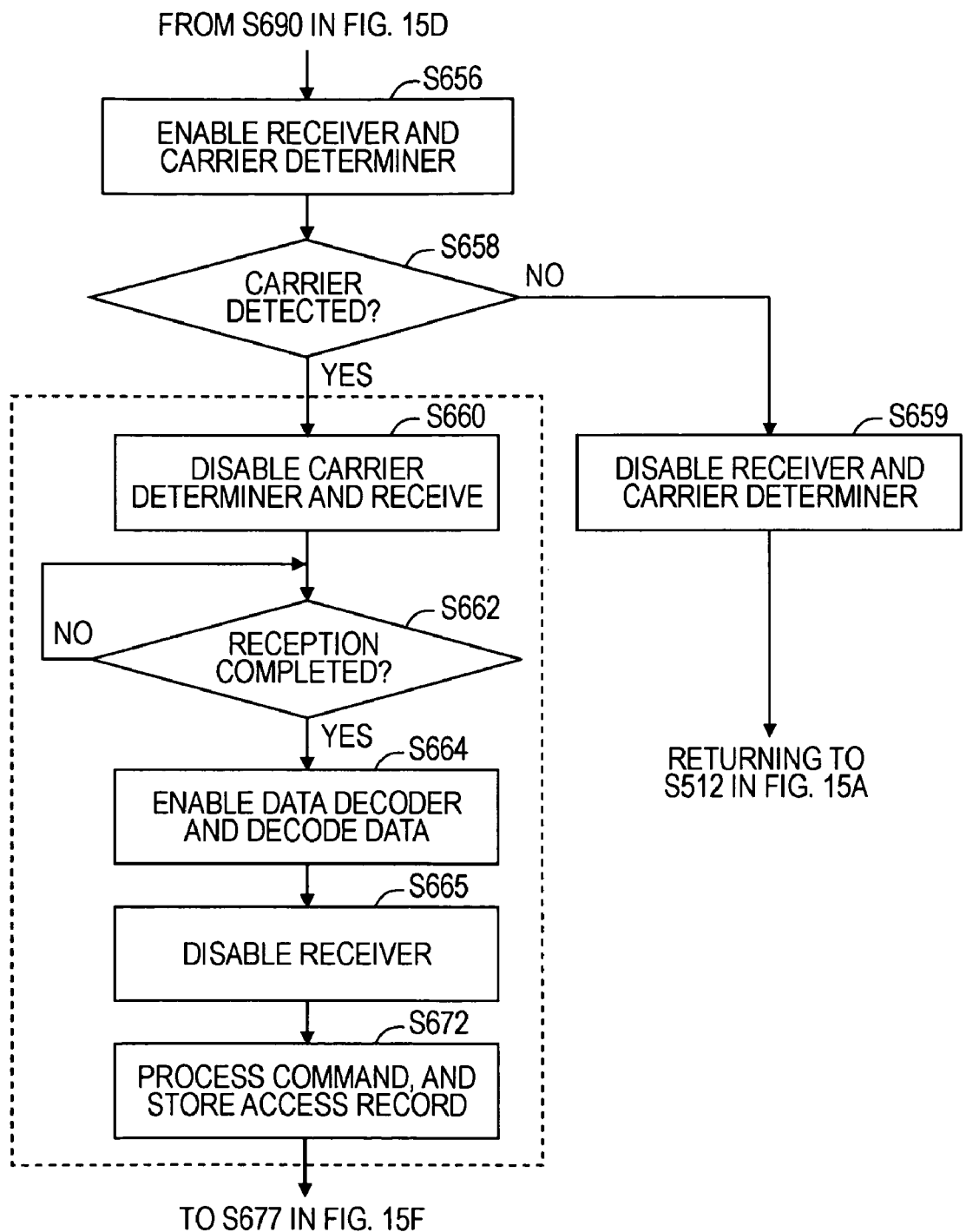

INFORMATION ACCESSING SYSTEM, INFORMATION APPARATUS, RECORDING MEDIUM AND METHOD FOR ACCESSING INFORMATION

CROSS-REFERENCE TO RELATED APPLICATIONS

This application is related to and claims priority under 35 U.S.C. §119(a) on Japanese Patent Application No. 2008-0004362 filed on Jan. 11, 2008 in the Japan Patent Office, and is incorporated by reference in its entirety herein.

BACKGROUND

1. Field

Embodiments of the present invention relate to a non-contact type of information apparatus that reads and writes information in a non-contact fashion and, in particular, to one of a radio frequency identification (RF-ID) tag and a non-contact type IC card, e.g., that accumulates a value detected by a sensor detecting one of a physical quantity and a physical state.

2. Background

An active battery-powered radio frequency (RF) identification (ID) tag is attached to a commercial product or a person. The active battery-powered RF-ID tag transmits an RF signal on a predetermined frequency related to the ID and information on the commercial product or the person. The RF signal is then read by a reader apparatus. A computer or the like may process the read information and thus monitor and manage the circulation of the commercial product and the behavior of the person. The active-type battery-powered RF-ID tag, in comparison with a passive RF-ID tag that needs to receive power from a reading/writing apparatus, has a relatively large communication coverage area and is practicable.

The RF-ID tag, having a sensor detecting a physical quantity in a surrounding environment, accumulates data of a value detected by the sensor. A reading/writing apparatus reads the data from the RF-ID tag to collect detected value data together with the identification (ID).

Japanese Patent Laid-Open No. 2000-113130A publicly disclosed in Japan dated Apr. 21, 2000 discusses an IC tag detection system operating at low power consumption. An IC tag used in the system includes a communication circuit, a controller, a power source for supplying power from a battery to the system, and a time measurement circuit. The IC tag performs a transmission operation at each predetermined set time. A plurality of IC tags having different set times are arranged. A detector device communicates with each of the IC tags and detects the presence or absence of each IC tag in response to communications with the IC tags. The detector device having a communication circuit determines the presence or absence of reception at each time set for each IC tag. Since no enquiry is made from the detector device, the IC tag is free from useless responding and power consumption.

Japanese Patent Laid-Open No. 2001-251210A (corresponding to U.S. Pat. No. 6,922,402B1) publicly disclosed in Japan dated Sep. 14, 2001 discusses a method of implementing a frequency lock in which each of transmitters on both nodes needs no separate reference oscillator in a duplex link. In the implementation method of the frequency lock, a carrier frequency of a transmitter is tuned using information relating to a receiving frequency in a full-duplex link so that transmission frequencies on both nodes are locked in the link. An offset in the carrier frequency of a first transmitter is detected as an offset in a corresponding second receiver. The second receiver shifts the carrier frequency of the corresponding transmitter in response to the detected offset, and notifies the first transmitter of the detected offset. The offset detected in the first receiver thus corrects the carrier frequency of the corresponding transmitter.

Japanese Patent Laid-Open No. 2006-72727 laid open in Japan dated Mar. 16, 2006 discusses a non-contact type IC tag having a sensor. In the non-contact type IC tag having the sensor, a clock set signal output to a clock from a controller is output via an electronic circuit including a tag effective period determiner between the controller and the clock. The tag effective period determiner causes the controller to output a tag effective period setting signal. With the tag effective period determiner arranged between the controller and the clock, the non-contact type IC tag having the sensor disables the operation of the clock during a tag effective period. In this way, without using encryption and a keyword, the non-contact type IC tag having the sensor makes it extremely difficult to alter results of measurement, and is also recycled.

SUMMARY

At least one embodiment of the present invention provides a method, to facilitate communication by a machine, including: receiving data transmitted from a reading/writing apparatus; detecting a data request signal; transmitting, to the reading/writing apparatus, a response signal responsive to the data request signal; acquiring, from a sensor, detected data indicative of at least one of a physical quantity and a physical state; storing the acquired detected data into a memory and setting thereafter a flag to a first state; transmitting the acquired detected data if the data request signal is detected and setting thereafter the flag to a second state; invoking an alarm if the flag is in the first state and a power switch is in an OFF state; and controlling the power switch to disconnect power from the power supply to the information apparatus if the flag is in the second state and the power switch is in the OFF state.

It is to be understood that both the foregoing summary description and the following detailed description are explanatory as to some embodiments of the present invention, and not restrictive of the present invention as claimed.

BRIEF DESCRIPTION OF THE DRAWINGS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

FIG. 2A depicts timing of a process of transmitting an RF signal carrying a tag information request command, according to an example of an embodiment of the present invention;

FIG. 2B depicts timing of a reception wait state and a reception process of a reception RF signal, according to an example of an embodiment of the present invention;

FIG. 2C depicts timing of a carrier sensing process, a reception process of the reception RF signal, and a transmission process of an RF signal carrying a response in a successful authentication process, according to an example of an embodiment of the present invention;

FIG. 3 depicts a process performed by a reading/writing apparatus, according to an example of an embodiment of the present invention;

FIGS. 4A and 4B depict a process performed by an active-type RF-ID tag, according to an example of an embodiment of the present invention;

FIGS. 6A-6C depict a process performed by an active-type RF-ID tag, according to an example of an embodiment of the present invention;

FIGS. 8A-8C depict frame structures for different commands transmitted by a reading/writing apparatus, according to an example of an embodiment of the present invention;

FIG. 9 depicts a process performed by a reading/writing apparatus for cooperating with an active-type RF-ID tag, in accordance with an example of an embodiment of the present invention;

FIGS. 10A-10C depict a process executed by an active-type RF-ID tag, according to an example of an embodiment of the present invention;

FIGS. 13A-13F depict a process performed by an active-type RF-ID tag, according to an example of an embodiment of the present invention;

FIGS. 15A-15F depict a process performed by an active-type RF-ID tag, according to an example of an embodiment of the present invention.

DESCRIPTION OF EMBODIMENTS

Figure 1:
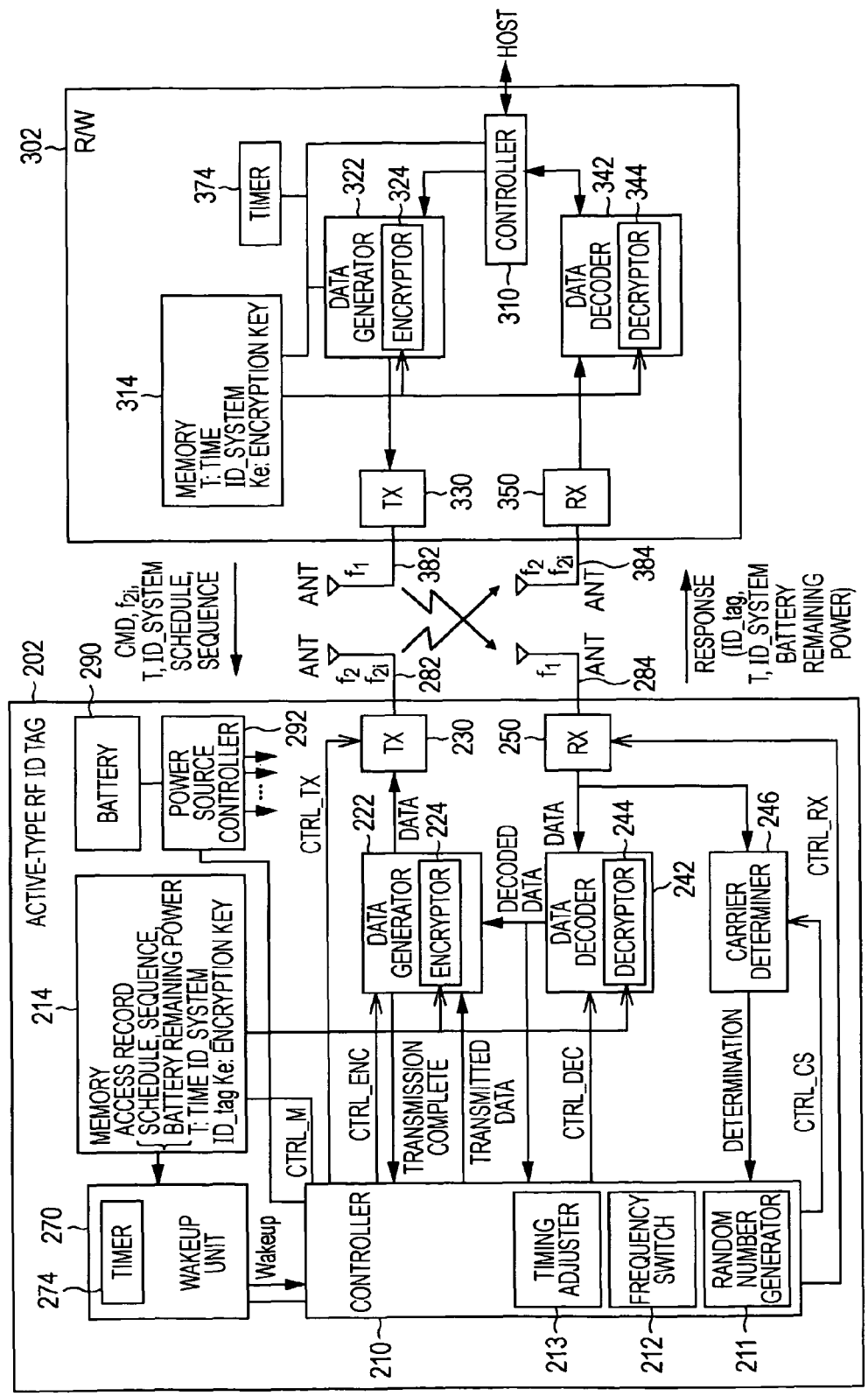
FIG. 1 depicts a system including an active-type RF-ID tag, which is an active-type of non-contact information storage apparatus, and a reading/writing apparatus, in accordance with an example of an embodiment of the present invention.

The embodiments of the present invention are described below with reference to the drawings. In the drawings, like elements are identified by like reference numerals.

FIG. 1 depicts a system including an active-type RF-ID tag 202, which is an active-type non-contact information storage apparatus, and a reading/writing apparatus 302. A non-contact IC card having the same structure as the active-type RF-ID tag 202 as an active-type non-contact information storage apparatus may be used instead of the active-type RF-ID tag 202. In such a case, data to be exchanged between the active-type RF-ID tag 202 and the reading/writing apparatus 302 is encrypted, and received data is decrypted and used for an authentication process. The authentication process may not be necessary. In such a case, it is not necessary to encrypt transmission data.

The active-type RF-ID tag 202 includes a controller 210, memory 214, data generator 222, transmitter (TX) 230, receiver (RX) 250, data decoder 242, carrier determiner 246, wakeup unit 270, transmitting antenna (ANT) 282, receiving antenna (ANT) 284, battery 290 and power source controller 292.

The wakeup unit 270 having a timer 274 measuring and presenting time remains continuously operative once the active-type RF-ID tag 202 is switched on. The wakeup unit 270 responds to the time from the timer 274, a preset control schedule read from the memory 214, and a time control sequence, thereby supplying to the controller 210 a wakeup signal having a carrier sensing period Tcs such as 2 seconds, for example.

The data generator 222 includes an encryptor 224. The encryptor 224 encrypts transmission data in accordance with a predetermined encryption method using an encryption key Ke stored on the memory 214. The data decoder 242 includes a decryptor 244. The decryptor 244 decrypts received data in accordance with the predetermined encryption method using an encryption key and a decryption key Ke. The predetermined encryption method may be, e.g., the common key system. Alternatively, the predetermined encryption method may be the public key encryption method.

The data generator 222 generates data in a predetermined format including a tag identification (ID_Tag) stored on the memory 214, encrypts the data in accordance with the predetermined encryption method, and encodes the encrypted data in accordance with a predetermined encoding method to generate encoded data. The resulting data may include an access record. The transmitter (TX) 230 modulates a carrier with the baseband encoded data received from the data generator 222, and then transmits a radio frequency (RF) signal on a frequency f2 or a different frequency f2$i$ (i=1, 2, . . . , n).

The receiver (RX) 250 receives and demodulates the RF signal on a frequency f1 to generate baseband encoded data. The receiver (RX) 250 generates data representing a carrier intensity of the received RF signal. The data decoder 242 decodes the received encoded data in accordance with the predetermined encoding method, decrypts the decoded data in accordance with the predetermined encryption method, and then supplies the decrypted data to each of the data generator 222 and the controller 210.

Upon receiving data indicating power of a received RF signal carrier from the receiver (RX) 250, the carrier determiner 246 determines the presence or absence of the received carrier and then supplies the determination results to the controller 210.

The transmitting antenna (ANT) 282 is coupled to the transmitter (TX) 230. The receiving antenna (ANT) 284 is coupled to the receiver (RX) 250. Alternatively, a single antenna may be used as the transmitting antenna (ANT) 282 and the receiving antenna (ANT) 284.

The frequency f1 and the frequency f2 are respectively 300 MHz and 301 MHz. The frequency f2$i$ is 301 MHz, 302 MHz, . . . , 305 MHz, for example. The output power of the transmitter (TX) 230 is 1 mW, for example.

The controller 210 includes a random-number generator 211, a frequency switch 212, and a timing adjuster 213. The random-number generator 211 generates a random number to select a transmission time slot at random. The frequency switch 212 switches a transmission frequency f2$i$. The timing adjuster 213 adjusts a transmission timing.

The battery 290 supplies power to the elements 210-270. The power source controller 292 controls the supply of output power of the battery 290 to each of the elements 210-270.

The controller 210 remains operative after switch-on. The controller 210 supplies a memory control signal CTRL_M, a data generation control signal CTRL_ENC, a transmission control signal CTRL_TX, a reception control signal CTRL_RX, a data decode control signal CTRL_DEC, a carrier determination control signal CTRL_CS, and a wakeup unit control signal to the memory 214, the data generator 222, the transmitter (TX) 230, the receiver (RX) 250, the data decoder 242, the carrier determiner 246, and the wakeup unit 270, respectively. The controller 210 may be one of a microprocessor and a microcomputer, each operating in accordance with a program.

The memory 214 stores information including a tag ID (ID_tag) of the active-type RF-ID tag 202, system ID (ID_system) and encryption key/decryption key Ke for authentication, present time T for authentication, access record of the reading/writing apparatus 302, control schedule and the time control schedule of the wakeup unit 270, current power remaining in the battery 290, carrier sensing period Tcs, reception process duration time, transmission period T, and transmission duration time. The memory 214 supplies the present time T and the system ID and the encryption key/decryption key Ke to each of the data generator 222 and the data decoder 242.

These pieces of information are transmitted beforehand by the reading/writing apparatus 302 to the active-type RF-ID tag 202 and are stored on the memory 214 by the controller 210. These pieces of information on the memory 214 are updated under the control of the controller 210.

The controller 210 corrects the time of the timer 274 in accordance with the time T stored on the memory 214. The present time T generated by the timer 274 is stored in the memory 214 for updating.

The system ID is commonly shared by the same group of a plurality of RF-ID tags including the reading/writing apparatus 302 and the active-type RF-ID tag 202. The system ID may be an ID of the reading/writing apparatus 302.

The reading/writing apparatus 302 includes a controller 310, memory 314, data generator 322, transmitter (TX) 330, receiver (RX) 350, data decoder 342, timer 374 measuring and presenting time, transmitting antenna (ANT) 382, and receiving antenna (ANT) 384.

The controller 310 transmits and receives data with a host computer (not shown).

The data generator 322 includes an encryptor 324. The encryptor 324 encrypts transmission data in accordance with a predetermined encryption method stored on the memory 314 with an encryption key Ke. The data decoder 342 includes a decryptor 344. The decryptor 344 decrypts received data in accordance with a predetermined encryption method with an encryption key/decryption key Ke.

The data generator 322 generates data in a predetermined format including a command (CMD) and the like received from the controller 310, encrypts the generated data, and encodes the encrypted data to generate encoded data.

The transmitter (TX) 330 modulates a carrier with baseband encoded data received from the data generator 322, and transmits a resulting RF signal on a frequency f1. An output power of the transmitter (TX) 330 is 100 mW, for example.

The receiver (RX) 350 receives an RF signal on a frequency f2 or f21-f2n. The data decoder 342 decodes the received data from the receiver (RX) 350, and decrypts the decoded data to generate baseband decrypted data. The data decoder 342 supplies the controller 310 with the decrypted data.

The transmitting antenna (ANT) 382 is coupled to the transmitter (TX) 330. The receiving antenna (ANT) 384 is coupled to the receiver (RX) 350. Alternatively, a single antenna may be commonly used as the transmitting antenna (ANT) 382 and the receiving antenna (ANT) 384.

Upon receiving a tag ID or a command such as a request command for tag information (hereinafter simply referred to as tag information request command) from a host computer, the controller 310 supplies the data including such a command to the data generator 322. The data may include the transmission frequency f2 or f2$i$ to be used by the active-type RF-ID tag 202, present reference time T, new or updated control schedule, and time control sequence. Such commands may include a command to correct or update time on the timer 274 together with the present time T. Furthermore, such commands may include a command to correct or update the schedule or sequence stored on the memory 214 together with the new or updated control schedule or time control sequence.

FIG. 2A depicts timing of a process 42 of transmitting, e.g., by the reading/writing apparatus 302, the RF signal carrying a tag information request command (CMD). FIG. 2B depicts timing, e.g., for the reading/writing apparatus 302, of a reception wait state 46 and a reception process 48 of a received RF signal. FIG. 2C depicts timing, for the active-type RF-ID tag 202, of carrier sensing operations 50, 52, and 53, reception processes 54 and 55 of the received RF signal, and a transmission process 56 of the RF signal carrying a response performed if authentication is successful.

With reference to FIG. 2A, the data generator 322 in the reading/writing apparatus 302 generates data including a tag information request command to an RF-ID tag received from the controller 310, encrypts the data, and encodes the encrypted data to generate the encoded data. The transmitter (TX) 330 transmits the RF signal carrying the command at consecutive time slots of the transmission process 42 periodically at sufficiently short intervals.

With reference to FIG. 2C, the receiver (RX) 250 and the carrier determiner 246 in the active-type RF-ID tag 202 are enabled by the controller 210 for a duration of, for example, about 1 ms to about 10 ms, throughout which the carrier sensing operations 50 and 52 last with a period Tcs of, for example, 2 seconds in response to the wakeup signal from the timer 274. With the receiver (RX) 250 and the carrier determiner 246 enabled, the receiver (RX) 250 remains in the reception wait state 46, and the carrier determiner 246 determines the presence or absence of the received carrier based on data indicating an intensity of a received RF signal carrier power from the receiver (RX) 250. If the active-type RF-ID tag 202 is not close enough to the reading/writing apparatus 302, the carrier determiner 246 detects no carrier (ND), thereby determining that no carrier is present.

At each interval 51 between the carrier sensing operations 50, the active-type RF-ID tag 202 is in a suspension mode. In the suspension mode, e.g., only the controller 210 and the wakeup unit 270 are enabled or powered on. The remaining elements 214-250 are disabled or powered off. The suspension interval 51 may be shorter than the length from the end of the carrier sensing operation 50 to the start of the next carrier sensing operation 50.

With the active-type RF-ID tag 202 being close to the reading/writing apparatus 302, the receiver (RX) 250 in the active-type RF-ID tag 202 may receive an RF signal. The carrier determiner 246 detects the carrier of the RF signal within the time duration of the carrier sensing operation 52 (DT), thereby determining that a carrier is present.

In response to the determination that the carrier is present, the receiver (RX) 250 and the data decoder 242 are enabled for a time duration (100 ms, for example) within the time of an immediately subsequent reception process 54.

The receiver (RX) 250 receives and demodulates the RF signal, generating encoded and encrypted data including the command. The data decoder 242 decodes that data, decrypts the decoded data, extracts the command from the decrypted data, and supplies the command to the controller 210.

The controller 210 authenticates the reading/writing apparatus 302 using the time T and the system ID included in the command. If the reading/writing apparatus 302 is successfully authenticated, the controller 210 enables the data generator 222 and the transmitter (TX) 230 for a time duration (100 ms, for example) within the time of a transmission process 56 selected at random within a time period. The data generator 222 encrypts data of desired information retrieved from the memory 214, including the tag ID (ID_tag), the time T, the system ID (ID_system), etc., and encodes the encrypted data.

For example, other desired information may include content of a commercial product in a package, quantity and state, sender, transfer, route information, and destination. The transmitter (TX) 230 modules the carrier with response data including the encrypted tag ID (ID_tag), and then transmits the RF signal.

If the authentication process is not successful, processing ends with data neither generated nor transmitted.

With reference to FIG. 2B, the receiver (RX) 350 in the reading/writing apparatus 302 remains in the reception wait state 46. When the receiver (RX) 350 receives the RF signal with the active-type RF-ID tag 202 approaching, the receiver (RX) 350 demodulates the received RF signal in the time duration of a reception process 48 into encoded and encrypted data.

The data decoder 342 decodes the encoded and encrypted data, and decrypts the decoded data, thereby reproducing the response data including the tag ID. The data decoder 342 then supplies the reproduced response data to the controller 310.

In response to the received reproduced response, the controller 310 authenticates the active-type RF-ID tag 202 using the time T and the system ID included in the response, and supplies the tag ID to the host computer.

The host computer processes the tag ID to monitor or manages the distribution, quality, and state of the commercial product, or persons.

The period while the active-type RF-ID tag 202 is not close to the reading/writing apparatus 302 is typically much longer than the period the two apparatuses are in close range. For this reason, the active-type RF-ID tag 202 remains in the suspension mode in most of the time.

The power consumption of the active-type RF-ID tag 202 is thus substantially reduced, and the service life of the battery 290 is substantially extended.

Normally, the reading/writing apparatus 302 and the active-type RF-ID tag 202 encrypt transmission data, and then authenticate each other using the time T and the system ID. Even if the data transmitted by each of the reading/writing apparatus 302 and the active-type RF-ID tag 202 is intercepted by a third party, the risk of unauthorized use of the data is very little. The security of the reading/writing apparatus 302 and the active-type RF-ID tag 202 is increased.

Figure 4B:
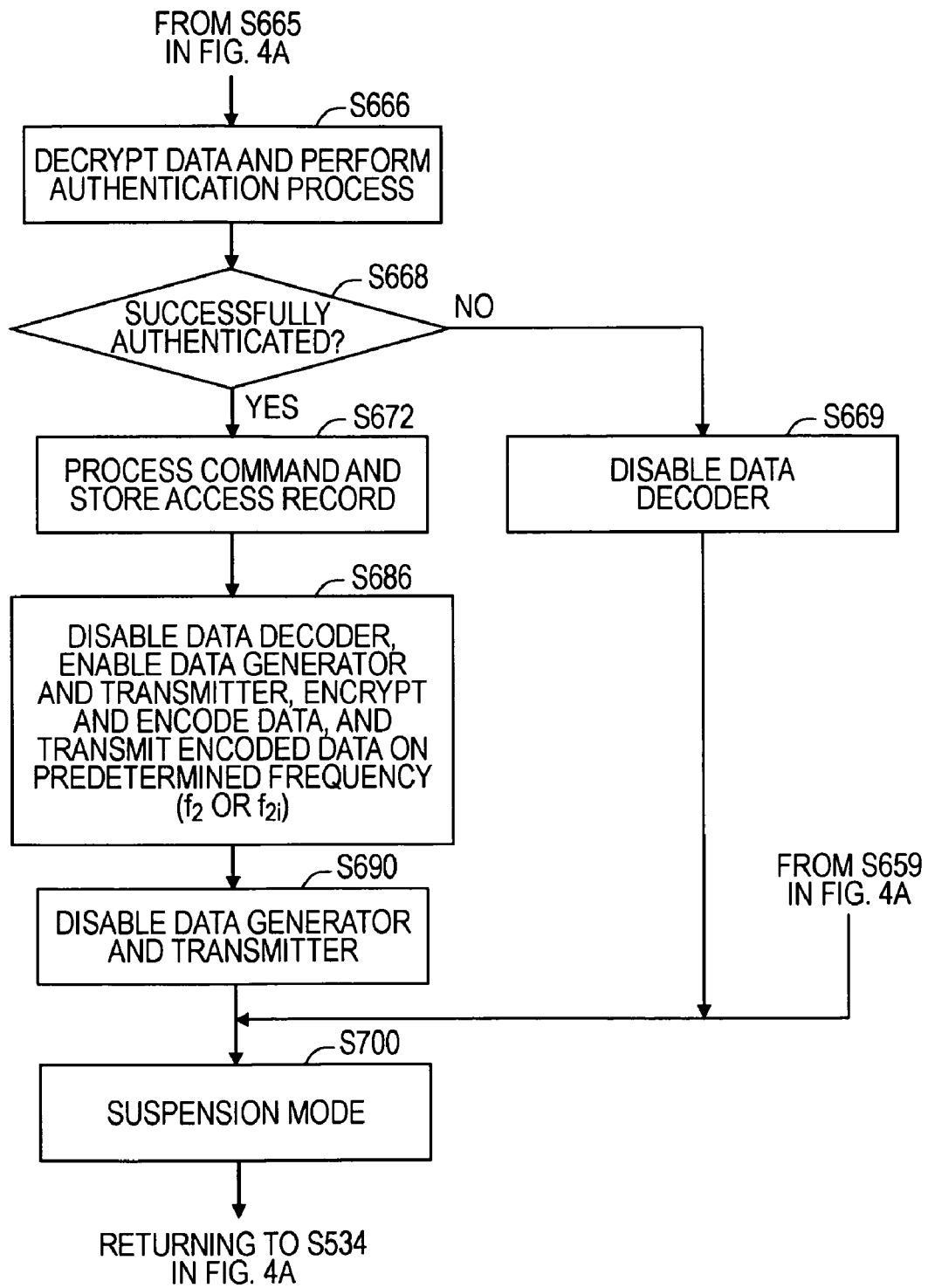

FIG. 3 depicts a process performed by the reading/writing apparatus 302 in accordance with one embodiment of the present invention. FIGS. 4A and 4B are operation charts illustrating a process performed by the active-type RF-ID tag 202.

Referring to FIG. 3, the controller 310 in the reading/writing apparatus 302 determines in operation S402 whether any tag information request has been received from the host computer. Operation S402 is repeated until a tag ID is requested. If it is determined in operation S402 that the tag information has been requested, processing proceeds to operation S414 in a transmission process and operation S422 in a reception process.

In operation S414, the controller 310 supplies both the tag information request command and information regarding the tag information request command to the data generator 322. The data generator 322 receives from the controller 310 data including the tag information request command, and the present time T and the system ID (ID_system) retrieved from the memory 314, and the ID of the reading/writing apparatus 302. The data generator 322 encrypts the data with the encryption key Ke in accordance with a predetermined encryption method such as data description standard (DES), triple DES, or advanced encryption standard (AES). And then, the data generator 322 encodes the encrypted data in accordance with a predetermined encoding method such as non return to zero (NRZ) encoding method or Manchester data encoding method. The transmitter (TX) 330 modulates the carrier with the encoded data during the transmission process 42 illustrated in FIG. 2A. The transmitter (TX) 330 transmits the resulting RF signal on the frequency f1. The controller 310 may include, into the tag information request command, data specifying either a transmission frequency f2 or a variable transmission frequency f2$i$ of the response responsive to the tag information request command, data representing time at which the variable transmission frequency f2$i$ is to be used, or a time slot, data representing the present time T, and the control schedule and the time control sequence.

The reading/writing apparatus 302 may vary the frequency 2f$i$ on the basis of each of a plurality of commands at a plurality of transmission periods tRW-CY (for example, on the basis of each of a plurality commands at a plurality of transmission periods tRW-CY, the number of transmission periods being equal to at least one carrier sensing period).

Even if a plurality of RF-ID tags coexist, the probability of collision of response transmissions from the RF-ID tags is reduced. The number of RF-ID tags concurrently identifiable by the reading/writing apparatus 302 is thus increased.

In operation S418, the controller 210 determines whether to end the data transmission. If it is determined in operation S414 that the data transmission is to be ended, the controller 210 ends and leaves this routine. If it is determined that the data transmission is to be continuously performed, the controller 210 returns to operation S414. As illustrated in FIG. 2A, the data transmission is repeated.

Referring to FIG. 4A, if the active-type RF-ID tag 202 is started in operation S502, the controller 210 and the wakeup unit 270 are enabled. Once the active-type RF-ID tag 202 is started, the controller 210 and the wakeup unit 270 continuously remain operative. In accordance with the timer 274 and the time control sequence, the wakeup unit 270 supplies to the controller 210 a wakeup signal representing a timing of carrier sensing of the RF signal with the period Tcs. In operation S534, the controller 210 determines whether the wakeup signal received from the wakeup unit 270 is in an ON state. The controller 210 repeats operation S534 until the wakeup signal is shifted to the ON state.

If it is determined in operation S534 that the wakeup signal is in the ON state, the controller 210 enables the receiver (RX) 250 and the carrier determiner 246 for a time duration as short as about 1 ms to about 10 ms, for example, in operation S656. The receiver (RX) 250 waits on standby for receiving the RF signal. The carrier determiner 246 determines the presence or absence of the carrier of the received RF signal based on the data representing the received carrier power received from the receiver (RX) 250. The carrier determiner 246 supplies the determination results to the controller 210. In operation S658, the controller 210 determines in response to the determination results whether the carrier has been detected or not. If it is determined that the carrier has not been detected, the controller 210 disables the receiver (RX) 250 and the carrier determiner 246 in operation S659. Processing proceeds to operation S700.

If it is determined in operation S658 that the carrier has been detected, the controller 210 disables the carrier determiner 246 in operation S660. With the receiver (RX) 250 remaining enabled for a time duration as long as about 100 ms to about 200 ms, the controller 210 receives from the reading/writing apparatus 302 the RF signal on the frequency f1 carrying the command (reception 54 in FIG. 2C), and then demodulates the received RF signal. In operation S662, the controller 210 determines whether the receiver (RX) 350 has completed the reception of the RF signal. The controller 210 repeats operation S662 until the reception of the RF signal is complete.

If it is determined in operation S662 that the reception of the RF signal has been completed, the controller 210 enables the data decoder 242 in operation S664. The data decoder 242 under the control of the controller 210 receives received data from the receiver (RX) 250, and decodes the received data in accordance with a predetermined decoding method. In operation S665, the controller 210 disables the receiver (RX) 250.

Referring to FIG. 4B, in operation S666, the data decoder 242 under the control of the controller 210 decrypts the decoded data with the encryption key/decryption key Ke retrieved from the memory 214 in accordance with the predetermined encryption method. The data decoder 242 supplies to the controller 210 the decrypted data including the command, tag ID (ID_tag), the present time T, and the system ID (ID_system). The data may also include the control schedule and the time control sequence. After receiving the data, the controller 210 compares the encrypted present time T and system ID with the present time T and system ID stored on the memory 214 for matching. The controller 210 thus authenticates the reading/writing apparatus 302.

In operation S668, the controller 210 determines whether the reading/writing device 302 has been successfully authenticated. If it is determined that the reading/writing device 302 fails to be authenticated, the controller 210 disables the data decoder 242 in operation S669. Processing then proceeds to operation S700.

If it is determined in operation S668 that the reading/writing device 302 has been successfully authenticated, the controller 210 receives the decoded and decrypted data including the tag information request command from the data decoder 242, processes the received command included in the decrypted data, and stores an access record from the reading/writing apparatus 302 in the memory 214 in operation S672.

If a time correction command and the present time T are included in the data being received, the controller 210 corrects or updates the time of the timer 274 in the wakeup unit 270 to that time T.

In operation S686, the controller 210 enables the data generator 222 and the transmitter (TX) 230 at one time slot selected at random from a predetermined number of time slots within a predetermined time period in accordance with the tag information request command. That selected time slot is the time duration of the transmission process 56 illustrated in FIG. 2C.

Using the encryption key Ke, the data generator 222 encrpts the data including the tag ID (ID_tag) of the active-type RF-ID tag 202, the time T, and the system ID (ID_system) read from the memory 214, and the data including the ID of the reading/writing apparatus 302 in accordance with the predetermined encryption method. The data generator 222 encodes the encrypted data in accordance with the predetermined encoding method, and then supplies the encoded data to the transmitter (TX) 230.

The transmitter (TX) 230 modulates the carrier with the encoded and encrypted data, and then transmits the resulting RF signal on the frequency f2 or f2i via the receiving antenna (ANT) 284 (transmission process 56 in FIG. 2C). The switching of the frequency 2fi is performed by the frequency switch 212 in the controller 210. The timing adjuster 213 adjusts the period of a plurality of time slots to a predetermined period.

In operation S690, the controller 210 disables the data generator 222 and the transmitter (TX) 230. In operation S700, the controller 210 sets the active-type RF-ID tag 202 to a suspension mode. For example, only the controller 210 and the wakeup unit 270 are kept enabled, and the other elements 214-250 are kept disabled.

Returning back to FIG. 3, the controller 310 enables the receiver (RX) 350 in operation S422. The receiver (RX) 350 waits for the reception of the RF signal on the frequency f2 (in the reception wait state 46) and receives the RF signal (the reception process 48). In operation S424, the controller 310 determines whether the receiver (RX) 350 has completed the reception of the RF signal. The controller 310 repeats operations S422-S424 until the reception of the RF signal is complete. If it is determined that the reception of the RF signal is complete, processing proceeds to operation S428.

In operation S428, the receiver (RX) 350 supplies the received data to the data decoder 342. The data decoder 342 decodes the received data in accordance with the predetermined encoding method, and decrypts the decoded data in accordance with the predetermined encryption method. The data decoder 342 then supplies to the controller 310 the decrypted data and the determination that the data has been received. The controller 310 compares the decrypted time T and system ID with the time T and system ID stored on the memory 314 for matching, thereby authenticating the active-type RF-ID tag 202. Even when each of the controller 210 in the active-type RF-ID tag 202 and the controller 310 in the reading/writing apparatus 302 detects an error to within a desired range between the received time T and the stored time T (for example, to within a range of ±0.5 second), the two times T may be determined as matching each other.

In operation S430, the controller 310 determines whether the authentication process has successfully been completed. If it is determined that the authentication process has failed, processing returns to operation S422. If it is determined that the authentication process has been successfully completed, processing proceeds to operation S432.

In operation S432, the controller 310 stores the decoded data in the memory 314 and transmits the decoded data to the host computer. In operation S436, the controller 310 determines whether to end the data waiting. If it is determined that the data waiting is to be ended, the controller 310 leaves this routine. If it is determined that the data waiting is to continue, processing returns to operation S422. The data waiting is repeated in FIG. 2B.

Since the reading/writing apparatus 302 transmits the RF signal periodically at sufficiently short intervals, and continuously remains in the RF signal waiting state, the carrier sensing time of the active-type RF-ID tag 202 is substantially shortened. In an input/output management where most of the operation time is for carrier sensing with transmission and reception operations performed only a few times a day, a reduction in the power consumption of the active-type RF-ID tag 202 leads to a substantial reduction in the overall power consumption.

As the control schedule stored on the memory 214, a time period from a first time to a second time on a weekday or a holiday (for example, 6:00 p.m. to 6:00 a.m.) may be specified, or a time period from a third time to a fourth time on a weekday (for example, 6:00 a.m. to 6:00 p.m.) may be specified. In such a case, the wakeup unit 270 does not generate the wakeup signal on holidays or at night, and the active-type RF-ID tag 202 remains in the suspension mode, thereby performing no carrier sensing operation at all. On the other hand, the active-type RF-ID tag 202 performs the carrier sensing operation with a predetermined period (for example, every second) in daytime on a weekday.

The wakeup unit 270 under the control of the controller 210 may generate the wakeup signal based on the remaining power P of the battery 290 stored on the memory 214. In such a case, if the battery remaining power P is sufficient, the carrier sensing operation may be performed with a relatively short period (every second, for example). If the battery remaining power P becomes lower than a threshold value Pt, the carrier sensing operation may be performed with a relatively long period (every 2 seconds, for example).

The access record of the reading/writing apparatus 302 is stored on the memory 214. If the reading/writing apparatus other than the reading/writing apparatus 302 makes an unauthorized access, the corresponding access record is also logged. The reading/writing apparatus 302 reads the access record. The host computer analyzes the access record, thereby detecting an unauthorized access.

The structure and operation of the reading/writing apparatus 302 are disclosed in Japanese Patent Laid-Open No. 2006-338489A (corresponding to U.S. patent No. 2006/276206A1). Japanese Patent Laid-Open No. 2006-338489A is incorporated by reference herein.

The active-type RF-ID tag 202 may include a sensor detecting one of a physical quantity and a physical state relating to a surrounding environment. The active-type RF-ID tag 202 records the detected value from the sensor, and the reading/writing apparatus 302 collects detected value data of one of the physical quantity and the physical state. If a difference between a current measurement value and a preceding measurement value is not above a threshold, no data may be recorded. Such an arrangement, e.g., saves power otherwise consumed for data recording, extends the battery service time of the RF-ID tag, and reduces a required memory capacity.

If the sensor is arranged in the active-type RF-ID tag 202 illustrated in FIGS. 1 through 4B to record the detected value periodically, the wakeup unit 270 generates periodically the wakeup signal with a predetermined period. In response, the sensor is temporarily enabled so that the detected value data is periodically stored on a detected value data storage area of the memory 214.

Figure 5:
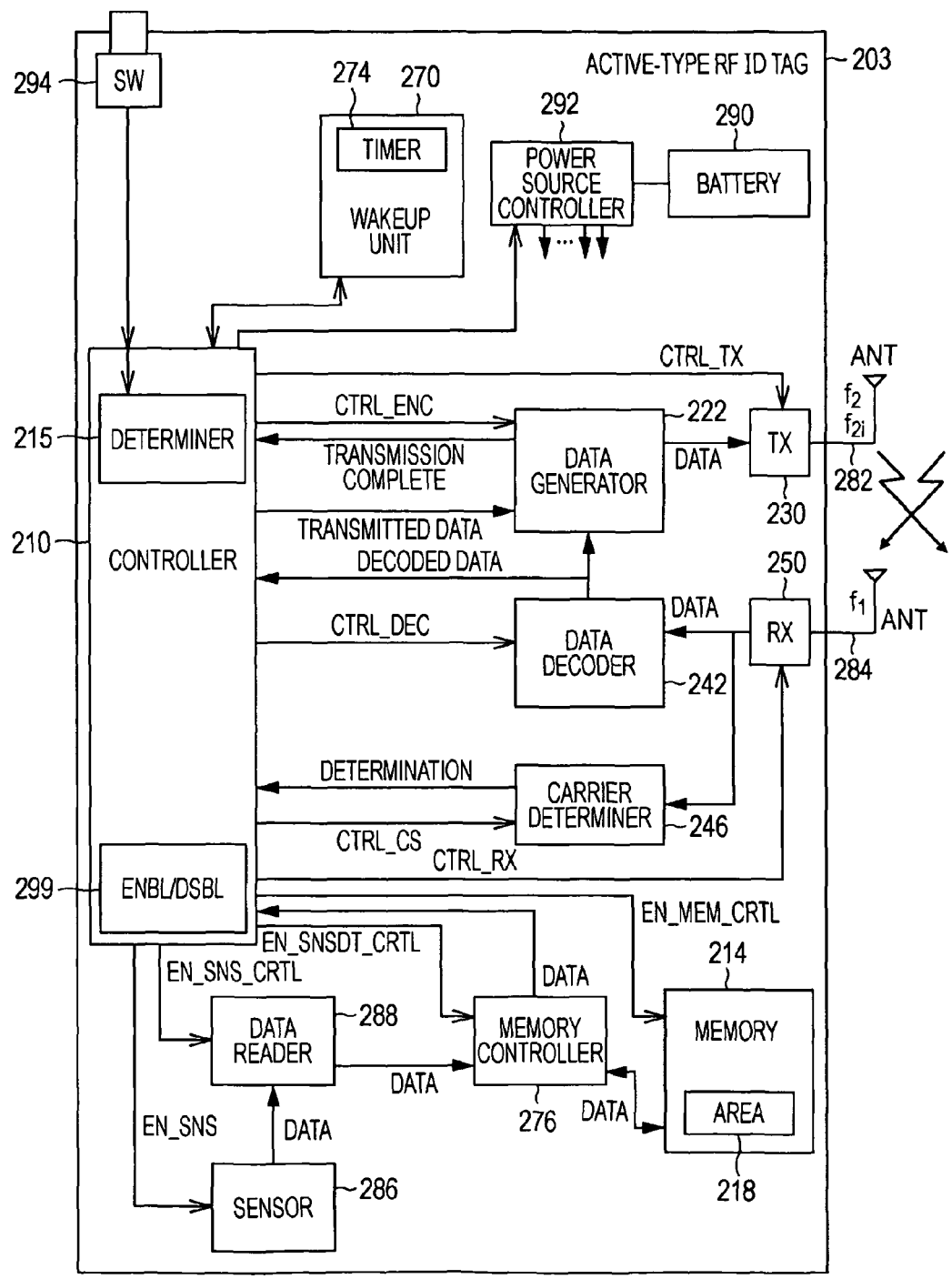
FIG. 5 depicts an active-type RF-ID tag, which again is an active-type of non-contact information storage apparatus, according to an example of an embodiment of the present invention.

FIG. 5 illustrates an active-type RF-ID tag 203 that is an active-type non-contact information recording device modified to detect a physical quantity and accumulate the detected value data of the physical quantity. The active-type RF-ID tag 202 illustrated in FIG. 1 is also referred to in the discussion of the active-type RF-ID tag 203.

The active-type RF-ID tag 203 includes, in addition to the elements 210-214, 222-270, 290 and 292 of the active-type RF-ID tag 202 illustrated in FIG. 1, a memory controller 276, a sensor 286, and a data reader 288 acquiring a detected value from the sensor 286 and storing the corresponding data. The active-type RF-ID tag 203 includes a manual power switch 294 to turn on and off power thereof. The controller 210 includes an enable/disable control signal generator 299 supplying an enable/disable control signal to each of the related elements 222-288, and a determiner 215 determining whether the power switch 294 is turned on or off. The rest of the structure of the active-type RF-ID tag 203 remains unchanged from that of the active-type RF-ID tag 202. The battery 290 supplies power to each of the elements 210-276, 286, 288, etc.

The elements 222-246, 276 and 288 are arranged as separate circuits in FIG. 1. Alternatively, these elements may be integrated with the controller 210. Alternatively, at least a part of the elements 222-246, 276 and 288 may be implemented in software as a function of the controller 210 operating in accordance with a program stored on the memory 214.

In response to the wakeup signal from the wakeup unit 270, the controller 210 (the enable/disable control signal generator 299) supplies control signals EN_MEM_CTRL, EN_SNS-DT_CTRL, EN_SNS and EN_SNS_CTRL to enable and disable the memory 214, the memory controller 276, the sensor 286, and the data reader 288, respectively.

The controller 210 receives one of a tag information request command and a detection data read request command CMD from the reading/writing apparatus 302. In response, the controller 210 causes the memory controller 276 to read stored data DATA of the detected value accumulated on a detected data storage area 218 of the memory 214, and then generates response data. The rest of the structure and operation of the active-type RF-ID tag 203 remains unchanged from that of the active-type RF-ID tag 202 illustrated in FIG. 1.

In response to the wakeup signal from the wakeup unit 270, the controller 210 in the active-type RF-ID tag 203 enables or disables the sensor 286 and the data reader 288 or the receiver (RX) 250 and the carrier determiner 246.

In response to the wakeup signal from the wakeup unit 270, the memory controller 276 acquires the detected value DATA from the data reader 288 and stores the detected value DATA onto the memory 214 together with present time and date. The controller 210 periodically carrier sensing operations 50 and 53. The controller 210 responds to the tag information request command of the reading/writing apparatus 302, thereby transmitting the present time and date and the detected data together with the tag ID.

The controller 210 in the active-type RF-ID tag 203 causes the data reader 288 to detect a value of a physical quantity (for example, ambient temperature) or a value of a state in an environment or an object, and causes the data reader 288 to read current data. The controller 210 then writes the current detected value on the detected data storage area 218 of the memory 214. The active-type RF-ID tag 203 then performs the carrier sensing. The memory controller 276 reads the detected data from the detected data storage area 218 of the memory 214, and then supplies the read data to the controller 210.

For example, the active-type RF-ID tag 203 may be used to manage a transportation route of an insulated container, time and date, and to monitor a change in temperature within the container. The sensor 286 is a temperature sensor in this case. The reading/writing apparatus 302 may be arranged in the container to accumulate the detected value data from the active-type RF-ID tag 203.

FIGS. 6A-6C depict a process performed by the active-type RF-ID tag 203 illustrated in FIG. 5. For convenience of explanation, the authentication operation illustrated in FIGS. 4A and 4B is not shown.

Referring to FIG. 6A, operations S502-S534 are identical to those in FIG. 4A, and the discussion thereof is omitted here.

In operation S622 subsequent to operation S534, the controller 210 determines whether it is a detection timing of the sensor 286. If it is determined that it is a detection timing, processing proceeds to operation S628. If it is determined that it is not a detection timing, processing proceeds to operation S652 illustrated in FIG. 6B.

In operation S628, the controller 210 enables the sensor 286 and the data reader 288, thereby causing the sensor 286 to detect temperature and the data reader 288 to read the detected value of the temperature. In operation S632, the controller 210 disables the sensor 286.

In operation S640, the controller 210 enables the memory controller 276 and the memory 214. In operation S642, the controller 210 enables the memory controller 276 temporarily, and the memory controller 276 stores the current detected temperature value from the data reader 288 in the detected data storage area 218 of the memory 214. In operation S644, the controller 210 disables the data reader 288, the memory controller 276, and the memory 214.

Referring to FIG. 6B, in operation S652, the controller 210 determines whether it is a carrier sensing timing or not. If it is determined that it is not a carrier sensing timing, processing returns to operation S534. If it is determined that it is a carrier sensing timing, processing proceeds to operation S656. Operations S656-S672 are identical to those in FIGS. 4A and 4B, and the discussion thereof is omitted here.

Referring to FIG. 6C, the controller 210 determines in operation S674 whether a received command is a parameter setting request command or a detected value data reading request command. If it is determined that the received command is the parameter setting request command, processing proceeds to operation S686.

Operation S686 is identical to that in FIG. 4B. In operation S686, the controller 210 transmits a response. In operation S688, the controller 210 determines whether the transmission is complete. Operation S688 is repeated until the transmission is complete. If it is determined that the transmission is complete, processing proceeds to operation S690. Operation S690 is identical to that in FIG. 4B.

In operation S692, the controller 210 sets a parameter in the active-type RF-ID tag 203 in response to the received command. The parameters may include a carrier sensing period, and period or time of detecting either a physical quantity or physical state. Processing proceeds to operation S700.

If it is determined in operation S674 that the received command is the detected value data reading request command, the controller 210 responds to the command in operation S680 to enable the memory controller 276 and the memory 214. In operation S682, the memory controller 276 reads the detected data such as the detected temperature value from the detected data storage area 218 of the memory 214 and then supplies the read data to the controller 210 (period 65). In operation S684, the controller 210 disables the memory controller 276 and the memory 214.

Operation S686 is identical to that in FIG. 4B. The controller 210 transmits the encoded and encrypted data and the RF signal carrying the tag ID to the reading/writing apparatus 302. Through operations S682 and S686 in which the detected value data is read and transmitted, the new detected value data stored on the detected data storage area 218 of the memory 214 is transmitted to the reading/writing apparatus 302.

The controller 210 determines in operation S688 whether the data transmission is complete. Operation S688 is repeated until the data transmission is complete. If it is determined that the data transmission is complete, processing proceeds to operation S690. Operation S690 is identical to that in FIG. 4B.

In operation S700, the controller 210 sets the wakeup unit 270 to the suspension mode. In the suspension mode, e.g., only the controller 210 and the wakeup unit 270 are enabled or powered on while the other elements 214, 222-250, 276, and 286-288 are disabled or power off. Processing proceeds to operation S534 in FIG. 6A.

As part of invention the present invention, the inventors recognized that even if the RF-ID tag detects one of a physical quantity and a physical state and accumulates data representing the detected physical quantity or the physical state, the reading/writing apparatus can fail to read the accumulated data if the RF-ID tag is turned off prior to the reading/writing apparatus attempting to read the accumulated detected data. The inventors also have recognized that the detected data on the RF-ID tag 202 can be erased once the power switch on the RF-ID tag is turned off.

As part of invention the present invention, the inventors have also observed that it may be beneficial for the accumulated detected data to be read from the RF-ID tag by the reading/writing apparatus prior to turning off the power switch of the RF-ID tag.

Figure 7:
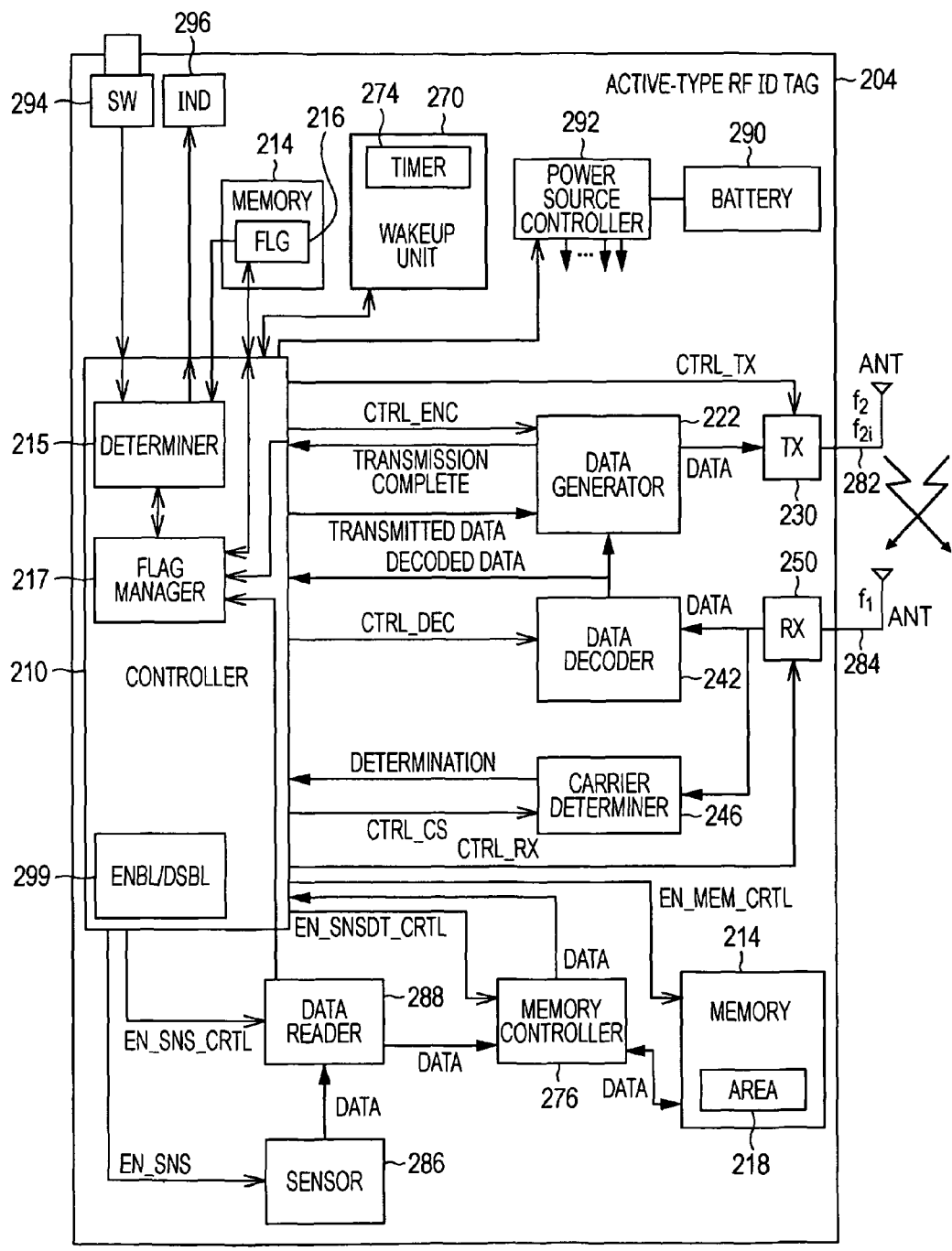
FIG. 7 depicts an active-type RF-ID tag, which again is an active-type of non-contact information storage apparatus, in accordance with an example of an embodiment of the present invention.

FIG. 7 depicts an active-type RF-ID tag 204, which is an active-type non-contact information storage apparatus. In the discussion of the active-type RF-ID tag 204, the reading/writing apparatus 302 illustrated in FIG. 1 is also referred to.

Referring to FIG. 7, the active-type RF-ID tag 204 includes, in addition to the elements 210-215, 222-294, and 299 in the active-type RF-ID tag 203 illustrated in FIG. 5, an indicator (IND) 296 such as a light-emitting diode (LED) for displaying an alarm or a sound alarm generator, and a read complete flag (FLG) 216 arranged in the detected data storage area 218 of the memory 214. Furthermore, the controller 210 includes a flag manager 217 in addition to elements 215 and 299. The determiner 215 determines whether the power switch 294 is on or off and determines whether the read complete flag 216 is on or off (corresponding to value 1 or value 0). The determiner 215 displays an alarm on the indicator 296. The flag manager 217 sets the read complete flag 216 to the off state (having the value 0) when the new detected value data read by the data reader 288 is stored onto the memory 214. The flag manager 217 sets the read complete flag 216 to the on state (having the value 1) when the data generator 222 has completed the transmission of the accumulated detected value data. The rest of the structure of the active-type RF-ID tag 204 is identical to each of the active-type RF-ID tag 202 and 203 respectively illustrated in FIGS. 1 and 5.

FIGS. 8A-8C depict frame structures of each of a variety commands to be transmitted by the reading/writing apparatus 304 or the like.

Referring to FIG. 8A, the frame of a tag request command includes fields for a start byte, a tag ID request command, a data length, data (or dummy data), an end byte, and a check byte (CRC).

Referring to FIG. 8B, the frame of a detected value data request command includes fields for a start byte, a detected value data read request command, a data length, data (or dummy data), an end byte, and a check byte (CRC).

Referring to FIG. 8C, the frame of a flag set request command includes fields for a start byte, a flag set request command, a flag value (0/1), a data length, data (or dummy data), an end byte, and a check byte (CRC).

FIG. 9 depicts a process to be performed by the reading/writing apparatus 302 in conjunction with the active-type RF-ID tag 204. FIGS. 10A-10C depict a process to be performed by the active-type RF-ID tag 204.

Referring to FIG. 9, in operation S401, the controller 310 in the reading/writing apparatus 302 determines whether the detected data read request has been received from the host computer or not. Operation S401 is repeated until the detected data read request has been received. If it is determined that the detected data read request has been received, processing proceeds to a transmission process in operation S413 and a reception process in operation S422.

In operation S413, the controller 310 supplies the detected data request and information related thereto to the data generator 322. The data generator 322 encrypts data including the tag information request command, detected data read request command or the like received from the controller 310 in accordance with the predetermined encryption method with the encryption key Ke. The data generator 322 encodes the encrypted data in accordance with the predetermined encoding method. The transmitter (TX) 330 modulates the carrier with the encoded data for the time duration of the transmission process 42 illustrated in FIG. 2A, and transmits the resulting RF signal on the frequency f1.

In operation S415, the controller 210 determines whether the response responsive to the command has been received or not. If it is determined that no response has been received, processing returns to operation S413. If it is determined that the response has been received, the controller 210 ends and leaves this routine.

Operations S422-S436 are identical to those in FIG. 3. The reading/writing apparatus 302 receives the detected data accumulated on the active-type RF-ID tag 204 related to either a physical quantity or a physical state. The reading/writing apparatus 302 stores the received data onto the memory 314 and supplies the received data to the host computer.

Referring to FIG. 10A, in operation S512, the determiner 215 in the controller 210 of the active-type RF-ID tag 204 determines whether the power switch 294 is currently on or not. If it is determined that the power switch 294 is on, processing proceeds to operation S534.

If it is determined in operation S512 that the power switch 294 is off, the determiner 215 in the controller 210 determines in operation S514 whether the read complete flag 216 is in the on state (having the value 1) or not. If it is determined that the read complete flag 216 is in the on state (having the value 1), the controller 210 switches the power of the power source controller 292, i.e., the active-type RF-ID tag 205 to off.

If it is determined that the read complete flag 216 is not in the on state, the determiner 215 starts in operation S516 displaying an alarm on the indicator 296 or starts lighting the indicator 296. The display of the alarm may be a combination of a visual alarm display and an audible alarm sound. The display of the alarm is quit when the power supply of the power source controller 292 ends. Subsequent to operation S516, processing returns to operation S512.

The user refers to the display of the alarm on the indicator 296, thereby recognizing that the detected data, which is not yet read by the reading/writing apparatus 302 or not yet transmitted, is present on the memory 214 in the active-type RF-ID tag 204. The user manually switches on the power switch 294 again. Once the power switch 294 is turned on, the detected data, which has been accumulated but not yet transmitted in operations S680-S690, is transmitted. In operation S694 of FIG. 10C, the read complete flag 216 is set to the on state. If the power switch 294 is turned off again later on, the power source controller 292 is set to an off state in operations S512-S520.

Alternatively, processing proceeds to operation S534 as represented by a broken line subsequent to operation S516 in FIG. 10A. If the accumulated detected data remains untransmitted, such accumulated detected data is transmitted in operations S680-S690, the read complete flag 216 is then set to the on state in operation S694. Power supply is then turned off.

Referring to FIG. 10A, operation S534 is identical to that in FIG. 6A. If it is determined in operation S534 that the wakeup signal is not in the on state, processing returns to operation S512. Operations S622-S640 are identical to those in FIG. 6A.

In operation S642 subsequent to operation S640, the controller 210 enables the memory controller 276 temporarily. And the memory controller 276 stores the current detected temperature value from the data reader 288 in the detected data storage area 218 of the memory 214. When the detected value data such as the detected temperature value is read by the memory controller 276, the data reader 288 notifies the flag manager 217 of the read data. Alternatively, when the memory controller 276 causes the detected value data of the data reader 288 to be stored in the detected data storage area 218 of the memory 214, the enable/disable control signal generator 299 may notify the flag manager 217 of the data storage or data reading. In response to the notification of the reading or storage of the detected value data of the data reader 288, the flag manager 217 sets the read complete flag 216 to the off state (having the value 0). In operation S644, the controller 210 disables the data reader 288, the memory controller 276, and the memory 214. Processing proceeds to operation S652 illustrated in FIG. 10B.

Referring to FIG. 10B, operations S652-S672 are identical to those in FIG. 6B. Processing returns to operation S512 subsequent to a non-affirmative answer to the determination in operation S652. Subsequent to operation S659, processing proceeds to operation S700. Subsequent to operation S672, processing proceeds to operation S674 in FIG. 10C.

Referring to FIG. 10C, operation S674 is identical to that in FIG. 6C. If it is determined in operation S674 that the received command is the parameter set request command, processing proceeds to operation S686. Operations S686-S690 on the right-hand side of FIG. 10C are identical to those in FIG. 6C.

If it is determined in operation S674 that the received command is the detected data read request command, processing proceeds to operation S680. Operations S680-S690 and S700 on the left-hand side of FIG. 10C are identical to those in FIG. 6C. Through the detected value data reading and transmission performed in operations S682 and S686, the new detected value data stored in the detected data storage area 218 of the memory 214 is transmitted to the reading/writing apparatus 302.

In operation S694 subsequent to operation S690 on the left-hand side of FIG. 10C, the flag manager 217 sets the read complete flag 716 to the on state (having the value 1). That flag means that the new detected value data stored on the detected data storage area 218 of the memory 214 has already been transmitted to the reading/writing apparatus 302. Processing then proceeds to operation S700. In succession to operation 700, processing returns to operation S512 in FIG. 10A.

Relative to FIGS. 7 through 10C, the active-type RF-ID tag 204 determines whether the accumulated detected data remains untransmitted when the user turns off the power switch 294. If it is determined that the accumulated detected data remains untransmitted, the alarm is presented on the indicator 296 without the power source controller 292 being turned off. The power of the active-type RF-ID tag 204 can thus be turned off after the transmission of the accumulated detected data. This arrangement reduces the chances of, if not prevents, the accumulated detected data stored on the active-type RF-ID tag 204 from being deleted.

Figure 11:
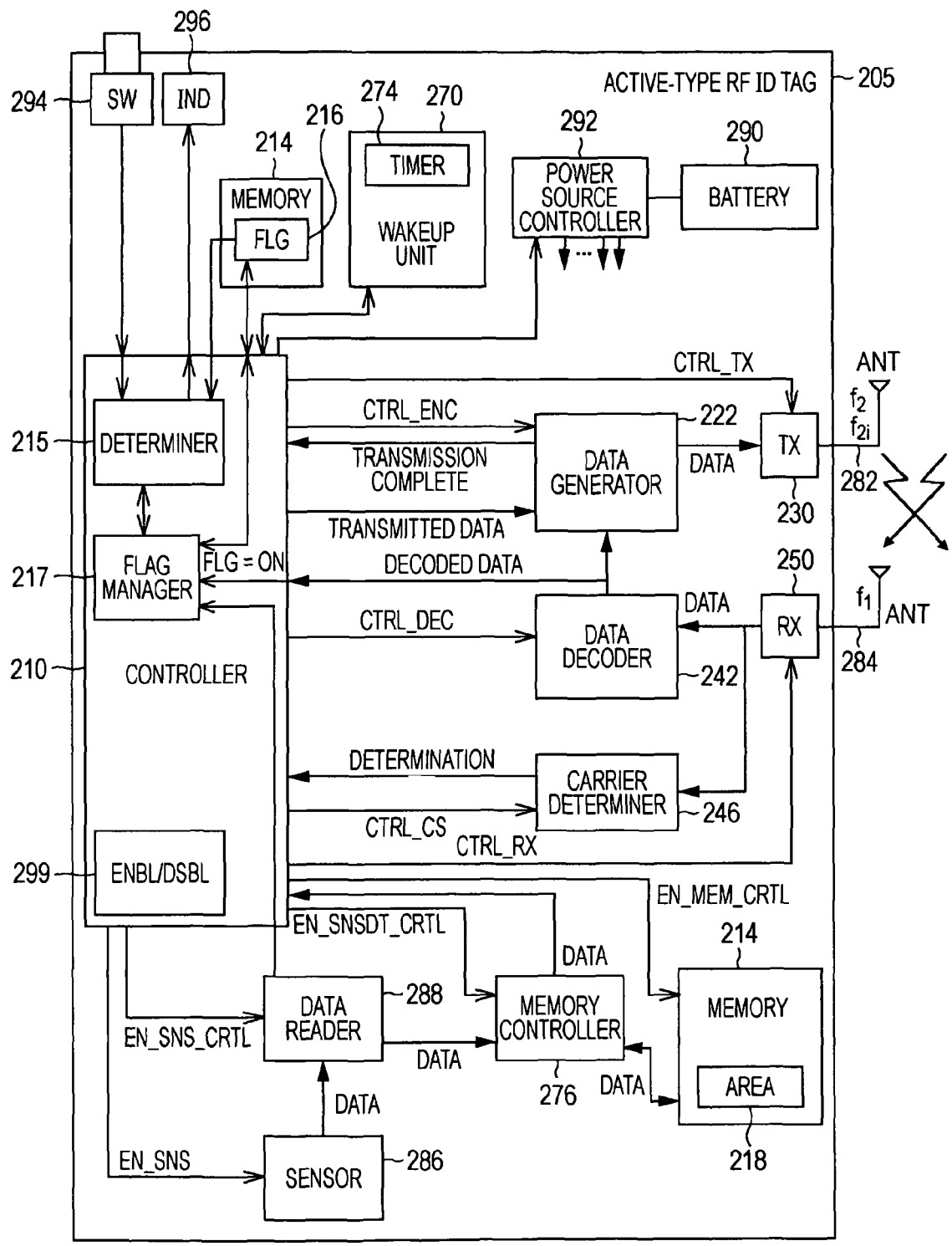
FIG. 11 depicts an active-type RF-ID tag, which again is an active-type of non-contact information storage apparatus, in accordance with an example of an embodiment of the present invention.

FIG. 11 depicts an active-type RF-ID tag 205 as an active-type non-contact information storage apparatus. In the discussion of the active-type RF-ID tag 205, the reading/writing apparatus 302 illustrated in FIG. 1 is also referred to.

Referring to FIG. 11, the active-type RF-ID tag 205 includes elements 222-299 identical to those in the active-type RF-ID tag 204 illustrated in FIG. 7. The flag manager 217 sets the read complete flag 216 to the off state (having the value 0) when the new detected value data read from the data reader 288 is stored on the memory 214 and sets the read complete flag 216 to the on state (having the value 1) when the receiver (RX) 250 receives the flag set command and the data decoder 242 decodes the flag set command. The flag set command is transmitted by the reading/writing apparatus 302 that has received the detected value data. The rest of the structure of the active-type RF-ID tag 205 remains identical to that of the active-type RF-ID tag 204 of FIG. 7.

Figure 12:
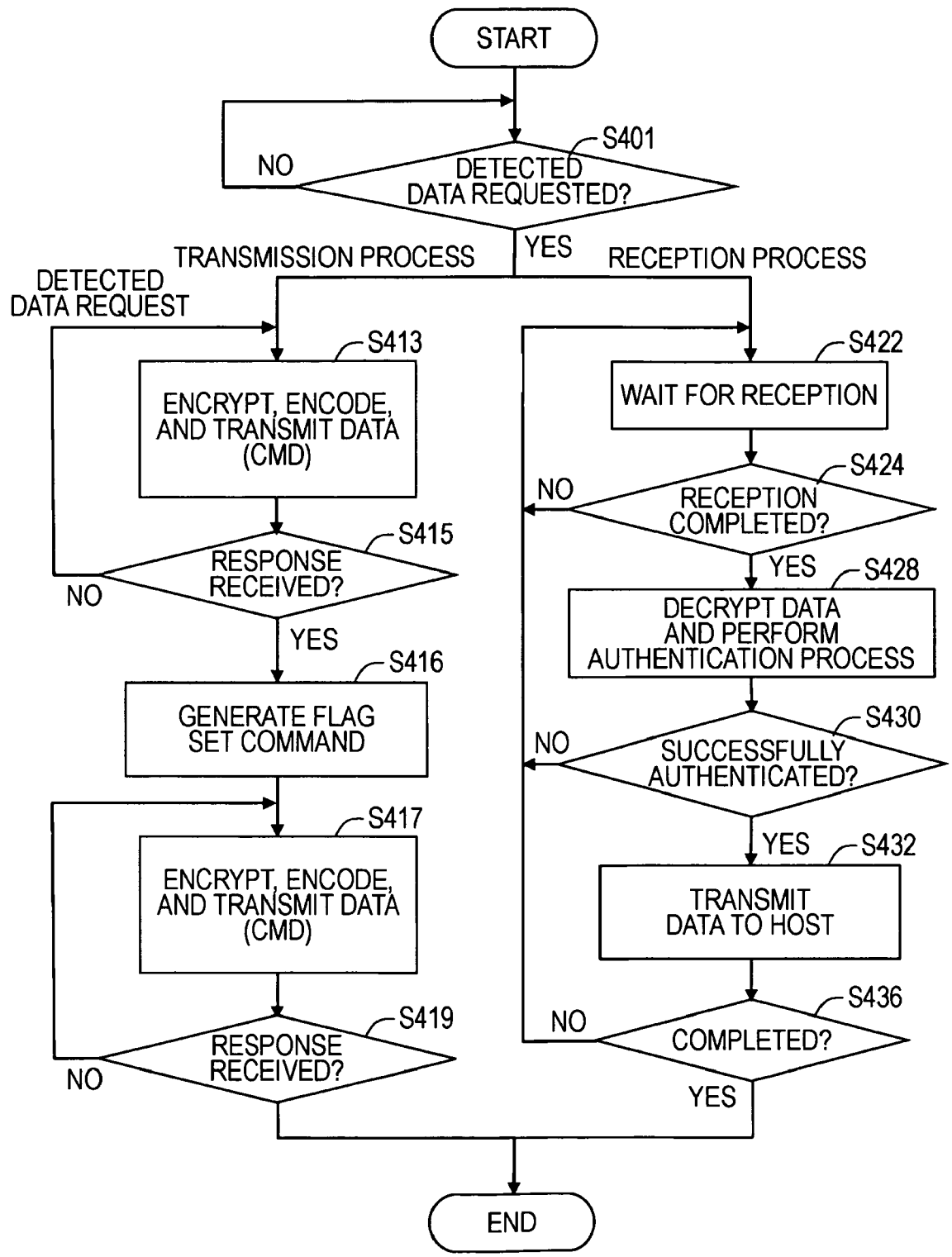
FIG. 12 depicts a process performed by a reading/writing apparatus that cooperates with an active-type RF-ID tag, in accordance with an example of an embodiment of the present invention.

FIG. 12 depicts a process performed by the reading/writing apparatus 302 working in conjunction with the active-type RF-ID tag 205. FIGS. 13A-13F depict a process performed by the active-type RF-ID tag 205.

Referring to FIG. 12, operations S401, S413-S415, and S422-S436 are identical to those in FIG. 9. If it is determined in operation S415 that the response has been received, the controller 310 in the reading/writing apparatus 302 generates the flag set command having the flag value of 1 and supplies the flag set command to the data generator 322 in operation S416.

In operation S417, the controller 310 supplies the flag set command and information related thereto to the data generator 322. The data generator 322 encrypts data including the flag set command received from the controller 310 in accordance with the encryption method with the encryption key Ke, and encodes the encrypted data in accordance with the predetermined encoding method. The transmitter (TX) 330 modulates the carrier with the encoded data for the time duration of the transmission process 42 illustrated in FIG. 2A, and transmits the corresponding RF signal on the frequency f1.

In operation S419, the controller 210 determines whether the response responsive to the flag set command from the active-type RF-ID tag 205 has been received. If it is determined that the response has not been received, processing returns to operation S417. If it is determined that the response has been received, the controller 210 ends and leaves this routine.

Figure 13A:
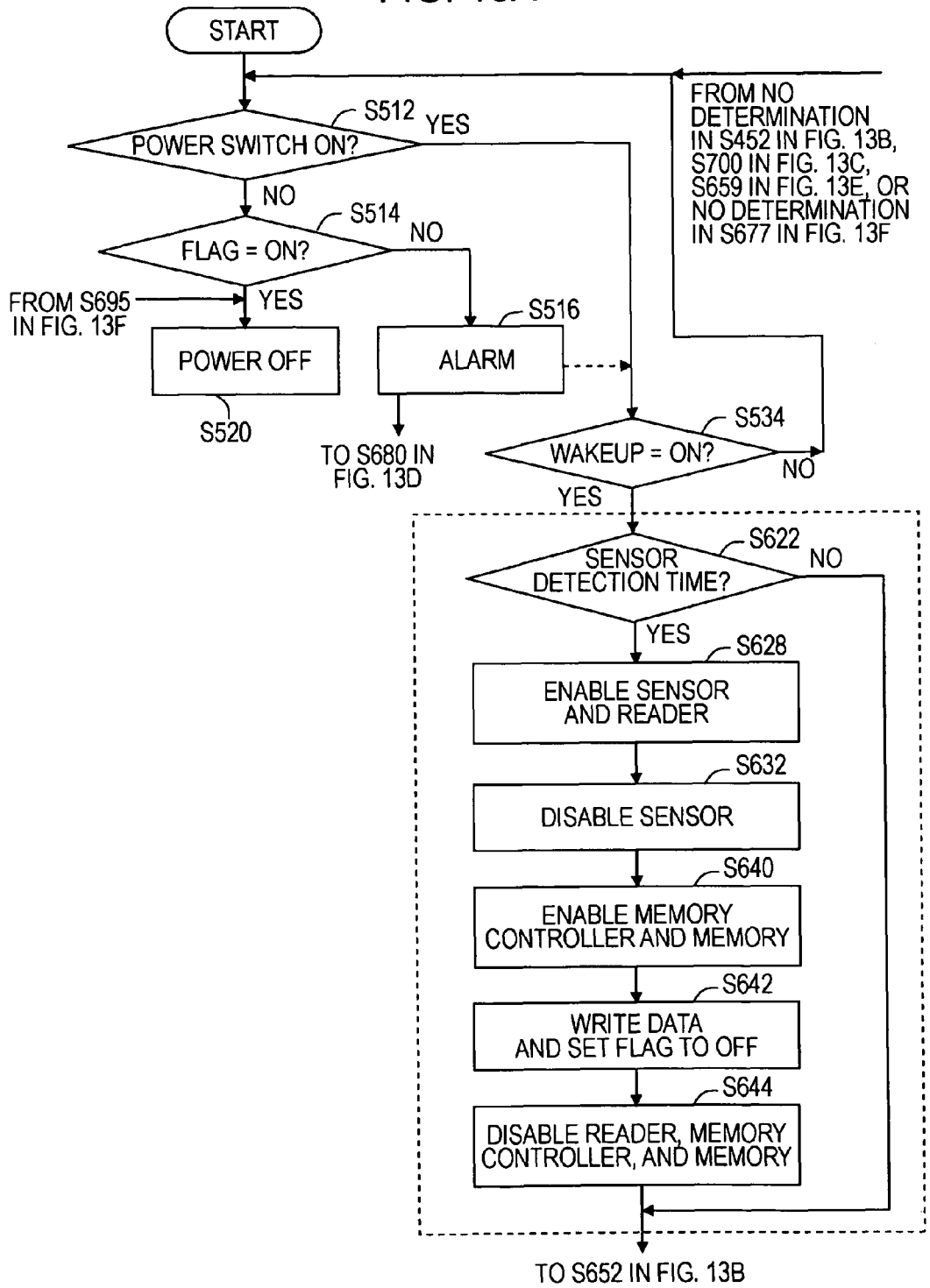

Referring to FIG. 13A, operations S512-S534, and S622-S644 are identical to those in FIG. 10A. Subsequent to operation S516, processing proceeds to operation S680 in FIG. 13D.

Referring to FIG. 13B, operations S652-S672 are identical to those in FIG. 10B.

Referring to FIG. 13C, in operation S675, the controller 210 determines whether the received command is the flag set request command or the detected value data reading request command. If it is determined that the received command is the flag set request command, processing proceeds to operation S686. Operations S686-S690 on the right-hand side of FIG. 13C are identical to those in FIG. 6C. In operation S686, the controller 210 transmits the response.

In operation S695 subsequent to operation S690 on the right-hand side of FIG. 13C, the flag manager 217 sets the read complete flag 716 to the on state (having the value 1). This flag means that the new detected value data stored on the detected data storage area 218 of the memory 214 has been received and read by the reading/writing apparatus 302. Processing proceeds to operation S700.

Figure 13D:
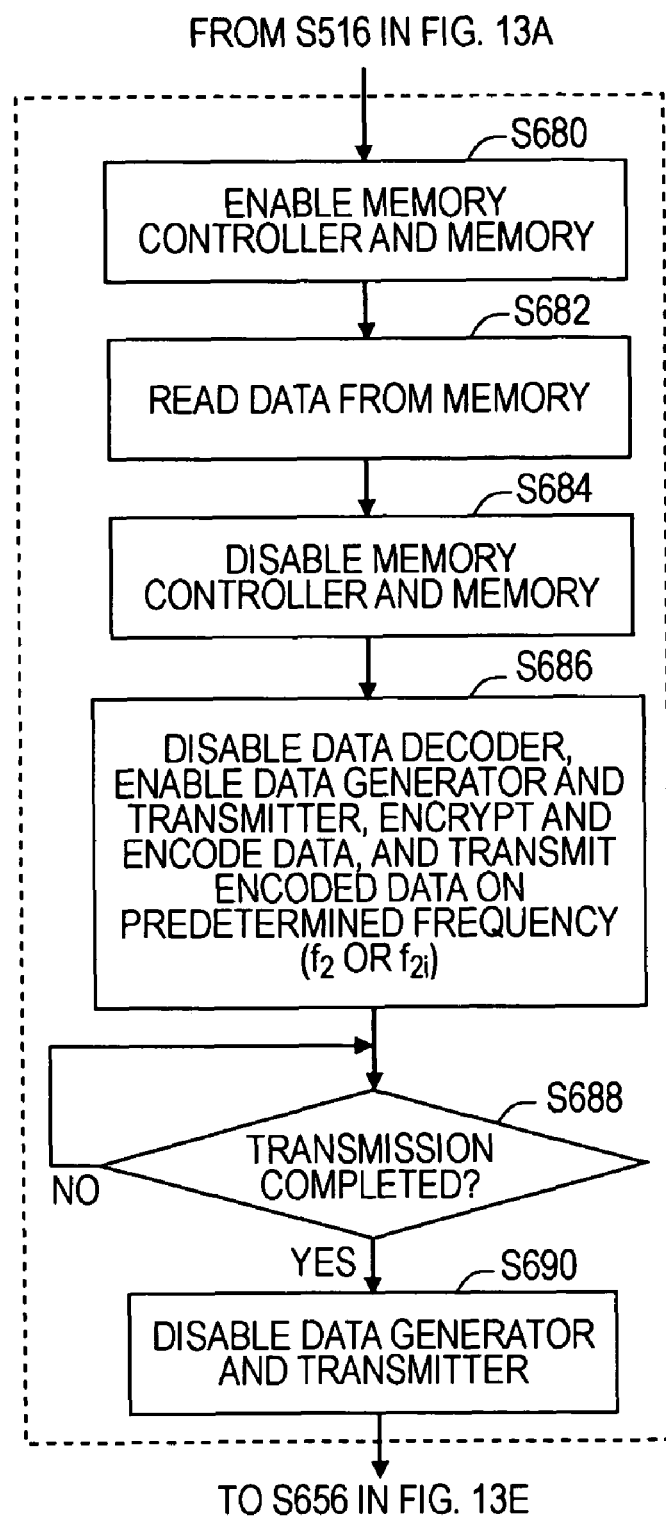

Referring to FIG. 13D, operations S680-S690, subsequent to operation S516 (FIG. 13A), enclosed by a broken-line box, are identical to those illustrated on the left-hand side of FIG. 13C. Subsequent to the generation of the alarm in operation S516, the detected data stored on the detected data storage area 218 of the memory 214 is read and then transmitted to the reading/writing apparatus 302. Upon receiving the detected data in operation S413 in FIG. 12, the reading/writing apparatus 302 transmits back the flag set request command in operations S416-S417 illustrated in FIG. 12. Subsequent to operation S690, processing proceeds to operation S656 in FIG. 13E.

Figure 13E:
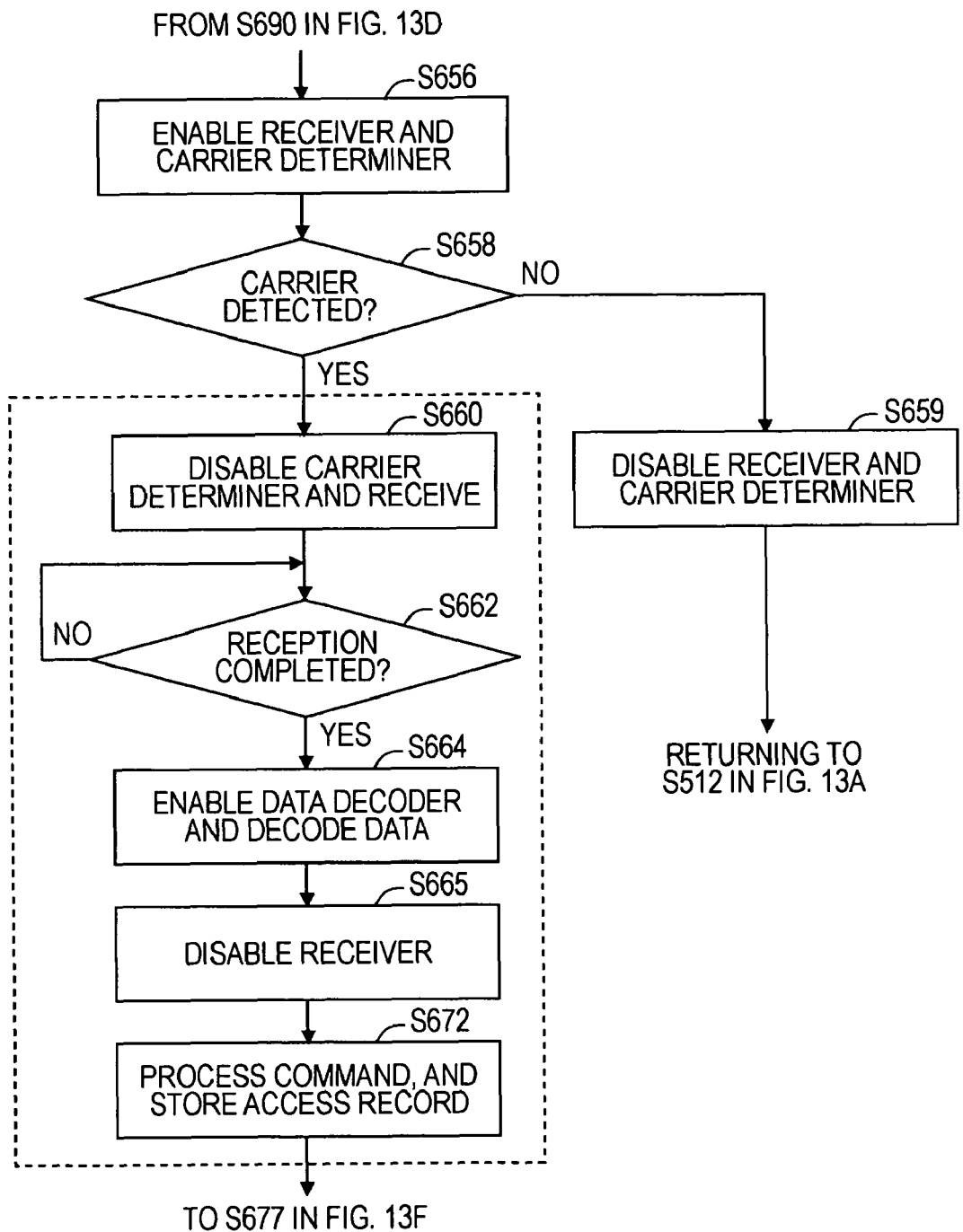

Referring to FIG. 13E, operations S656-S672 are identical to those in FIG. 13B. After the detected data is transmitted, the controller 210 waits on standby for the flag set request command from the reading/writing apparatus 302. Subsequent to operation S659, processing returns to operation S512 in FIG. 13A. Subsequent to operation S672, processing proceeds to operation S677 in FIG. 13F.

Figure 13F:
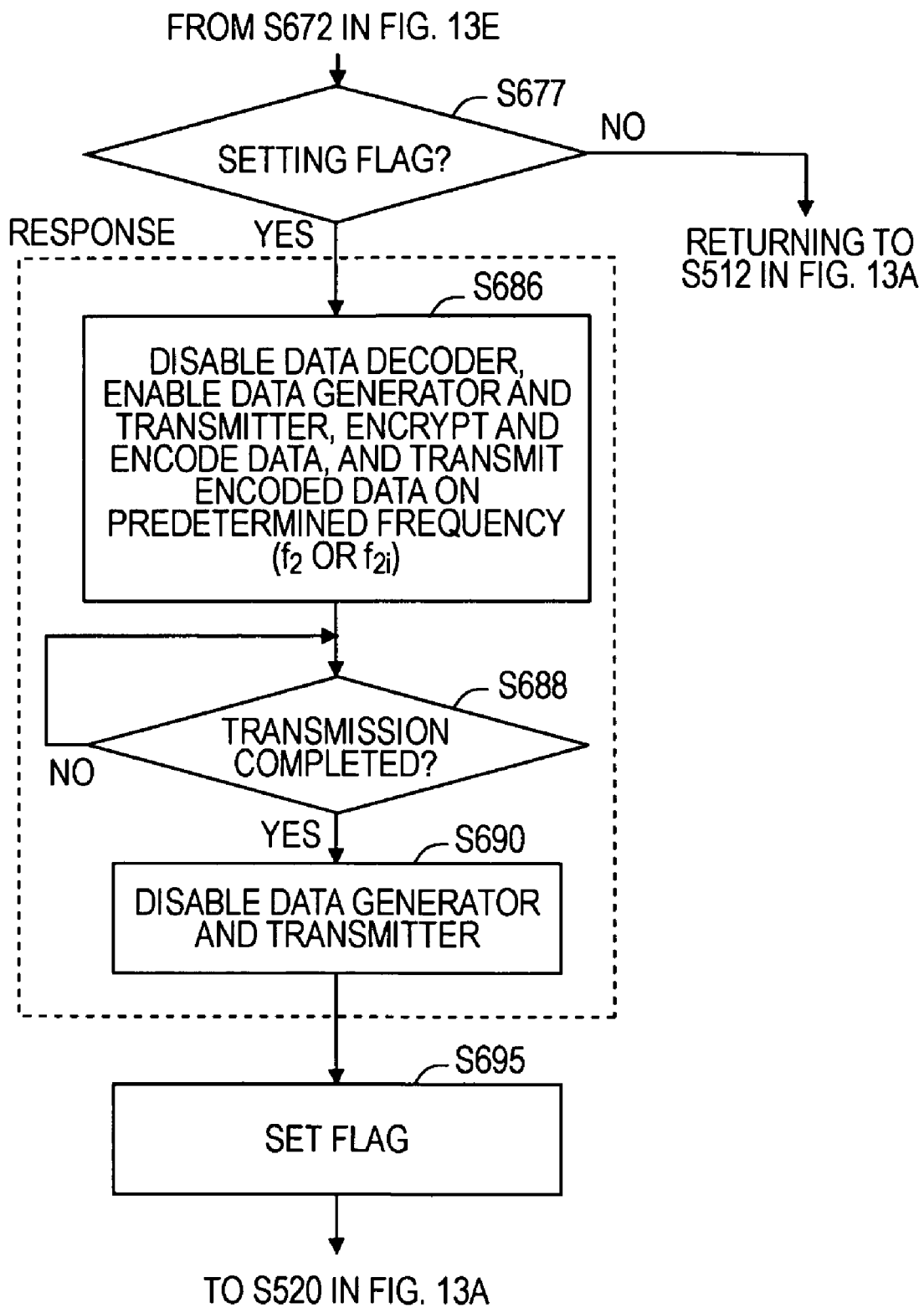

Referring to FIG. 13F, the controller 210 determines in operation S677 whether the received command is the flag set request command. If it is determined that the received command is not the flag set request command, processing returns to operation S512 in FIG. 13A. In this way, operations S512, S514 and S516 (alarm) in FIG. 13A, and operations S680-S672 in FIG. 13D (data retransmission) and FIG. 13E (command reception) are repeated. If it is determined in operation S677 that the received command is the flag set request command, processing proceeds to operation S686.

Operations S686-S695 are identical to those illustrated in FIG. 13C. Through these operations, the active-type RF-ID tag 205 receives the flag set request command from the reading/writing apparatus 302 and sets the read complete flag 216 to the on state. Subsequent to operation S695, processing proceeds to operation S520 in FIG. 13A not via the suspension mode. In operation S520, the controller 210 controls the power source controller 292 to the off state.

Figure 14:
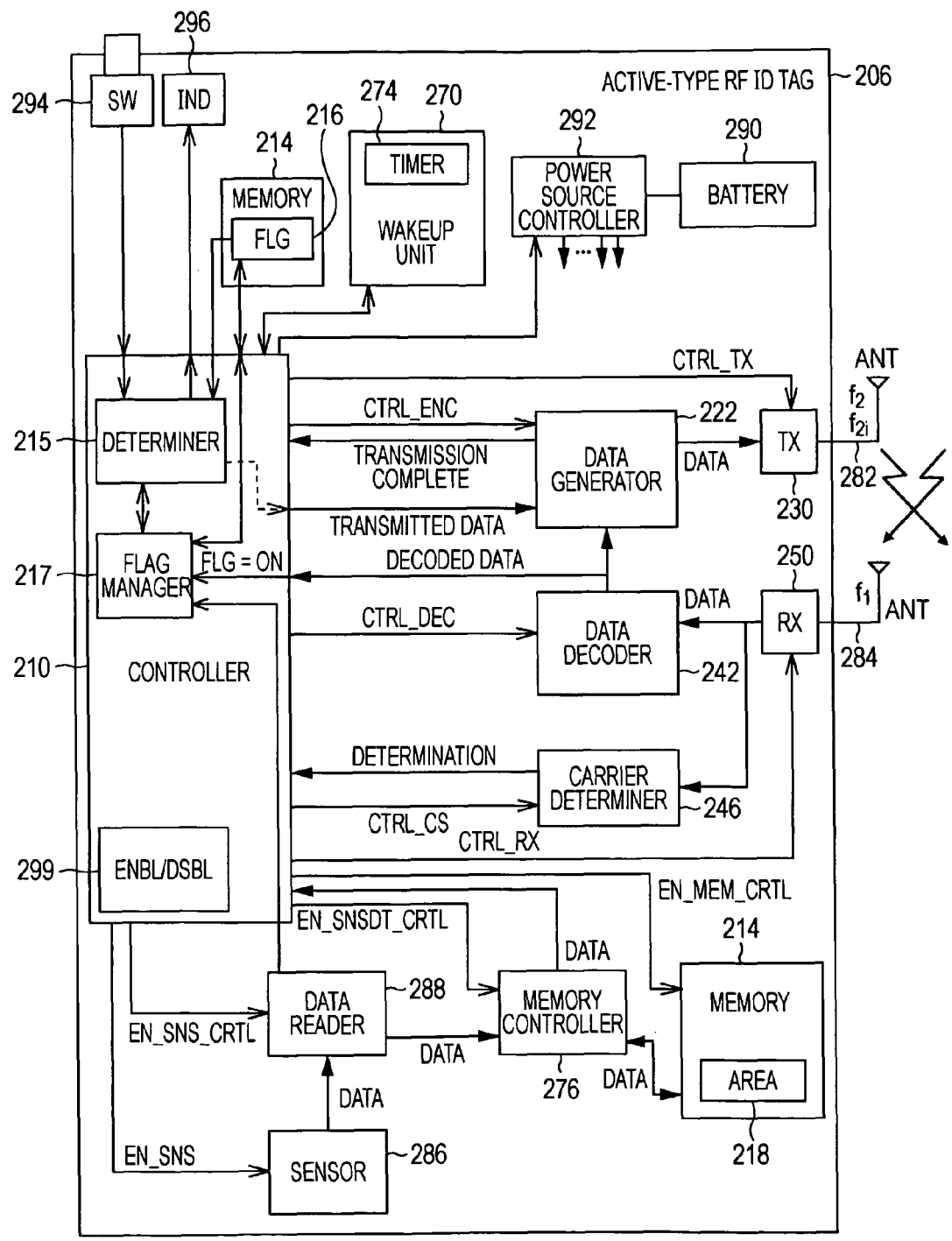
FIG. 14 depicts an active-type RF-ID tag, which again is as an active-type non-contact information storage apparatus, in accordance with an example of an embodiment of the present invention.

FIG. 14 depicts an active-type RF-ID tag 206 as an active-type non-contact information storage apparatus. The active-type RF-ID tag 206 are described referring to the reading/writing apparatus 302 illustrated in FIG. 1. The reading/writing apparatus 302 operates in accordance with the operation chart of FIG. 12.

Referring to FIG. 14, the active-type RF-ID tag 206 is identical in structure to the active-type RF-ID tag 205 illustrated in FIG. 11. The flag manager 217 sets the read complete flag 216 to the off state (having the value 0) when the new detected value data read by the data reader 288 is stored in the detected data storage area 218 of the memory 214. The flag manager 217 sets the read complete flag 216 to the off state (having the value 1) when the flag set command from the reading/writing apparatus 302 is received by the receiver (RX) 250 and then decoded by the data decoder 242. The rest of the structure of the active-type RF-ID tag 206 is identical to the active-type RF-ID tag 204 illustrated in FIG. 7.

FIGS. 15A-15F depict a process performed by the active-type RF-ID tag 206.

Operations S512-S534 and S622-S644 illustrated in FIG. 15A are identical to those illustrated in FIG. 13A. Operations in S652-S672 illustrated in FIG. 15B are identical to those illustrated in FIG. 13B.

Referring to FIG. 15C, operation S675 is identical to that illustrated in FIG. 13C. If it is determined in operation S675 that the received command is the flag set request command, the determiner 215 determines in operation S676 whether the read complete flag 216 is in the off state (having the value 0) or not. If it is determined that the read complete flag 216 is not in the off state, i.e., the read complete flag 216 is in the on state, processing returns to operation S512 in FIG. 15A. If it is determined that the read complete flag 216 is not in the off state, i.e., no untransmitted detected data is present, the controller 210 causes the detected data accumulated on the detected data storage area 218 of the memory 214 not to be transmitted even if the detected data request command has been received. This arrangement reduces the chances of, if not avoids, unnecessary transmission of the detected data from the active-type RF-ID tag 206. This arrangement further reduces the probability of collision of transmissions among a plurality of RF-ID tags.

If it is determined in operation S676 that the read complete flag 216 is in the off state, processing proceeds to operation S680. Operations S680-S700 on the left-hand portion of FIG. 15C are identical to those illustrated in FIG. 13C. Operations S686-S695 illustrated in the right-hand portion of FIG. 15C are identical to those illustrated in FIG. 13C.

Figure 15D:
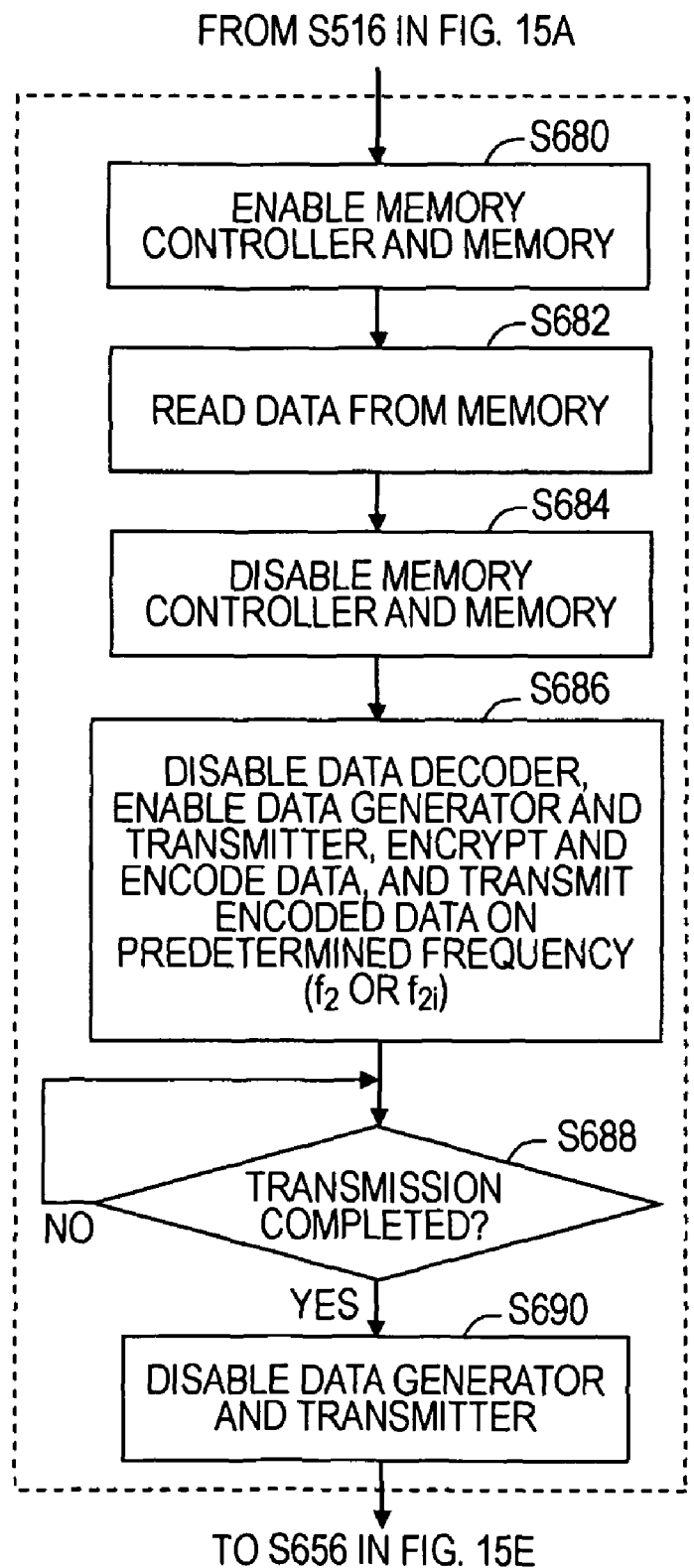
Figure 15F:
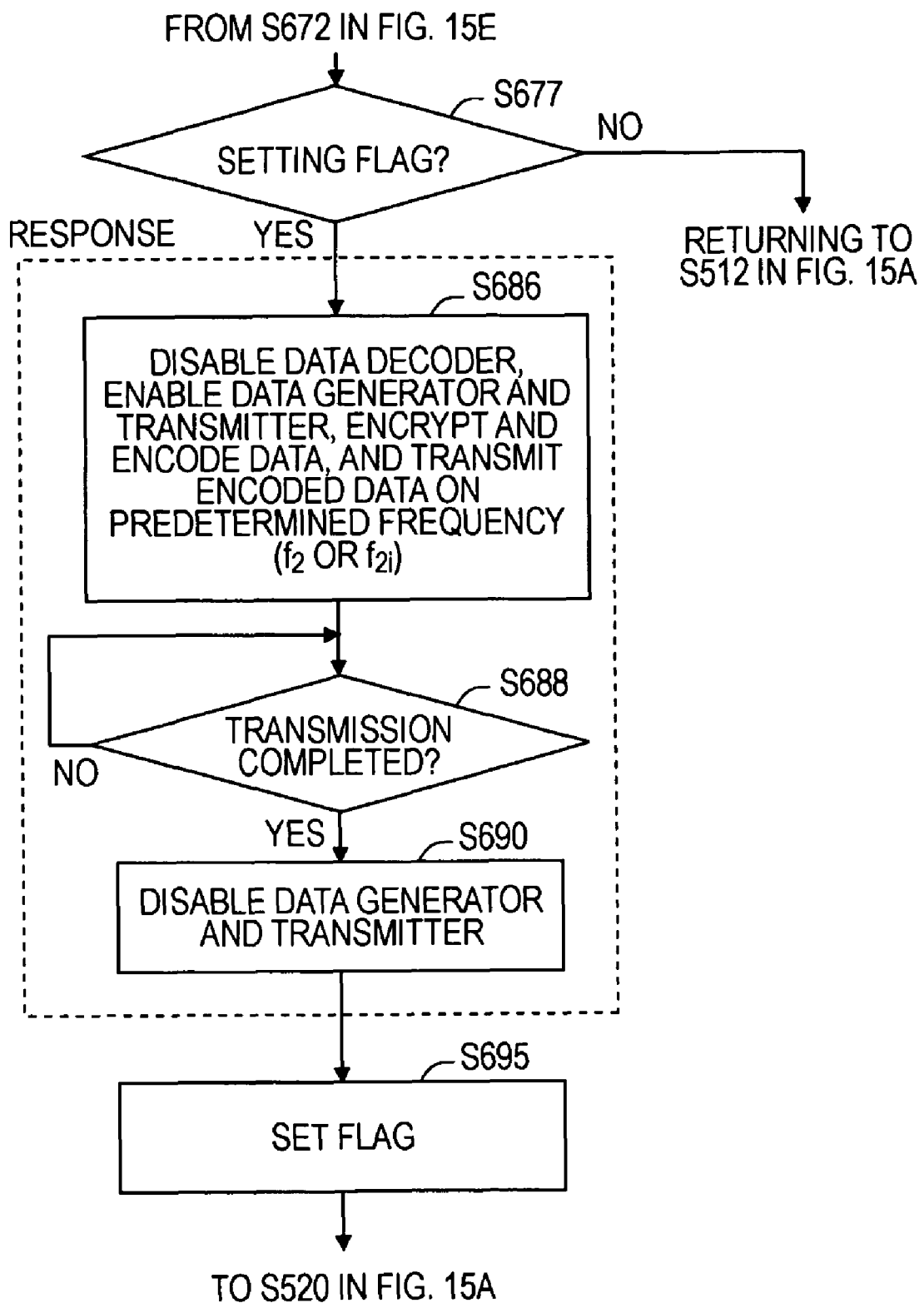

Operations S680-S690 illustrated in FIG. 15D are identical to those illustrated in FIG. 13D. Operations S656-S672 illustrated in FIG. 15E are identical to those illustrated in FIG. 13E. Operations S677-S695 illustrated in FIG. 15F are identical to those illustrated in FIG. 13F.

Operation S676 illustrated in FIG. 15C may be arranged in the same manner as operation S676 is arranged between operations S674 and S680 as represented by arrow-headed broken lines in FIG. 10C.

The above discussion is couched in a context of an RF-ID tag. The present invention, however, is not limited to solely to RF-ID tags. As would be understood by one skilled in the art, embodiments of the present invention also are applicable to a non-contact IC card, etc.

At least one embodiment of the present invention may also be embodied as machine-readable data including executable instructions that are recorded on a machine-readable recording medium. The machine-readable recording medium is any data storage device that can store the data, including the executable instructions, and which can be read by a machine, e.g., a computer system, so as to provide the machine with the executable instructions included in the recorded data for execution. Examples of the machine-readable recording medium include read-only memory (ROM), random-access memory (RAM), CD-ROMs, magnetic tapes, floppy disks, optical data storage devices, etc. The machine-readable recording medium may also be distributed over network coupled computer systems so that the machine-readable code is stored and executed in a distributed fashion.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

What is claimed is:

1. An information accessing system to access information stored on an information apparatus using a reading/writing apparatus communicable therewith, the information accessing system comprising:
   the reading/writing apparatus including at least the following,
      a first transmitter to wirelessly transmit a data request signal to the information apparatus and transmit a flag set request, and
      a first receiver to wirelessly receive a response signal from the information apparatus and to receive detected data; and
   the information apparatus including at least the following,
      a second receiver to wirelessly detect and receive the data request signal,
      a second transmitter to wirelessly transmit the response signal in response to the data request signal,
      a reader to acquire, from a sensor, detected data indicative of one of a physical quantity and a physical state,
      a memory to store the detected data acquired by the reader,
      a power switch having an ON state and an OFF state to selectively connect or disconnect power from a power supply to the information apparatus, and
      a controller;
   the controller being operative to do at least the following,
      start the reader at a desired recurring timing,
      store the detected data acquired by the reader into the memory,
      set a flag to a first state when the detected data is stored into the memory,
      start the second receiver according to the desired recurring timing,
      cause the second transmitter to transmit the detected data stored in the memory if the second receiver receives the data request signal,
      invoke an alarm if the flag is in the first state and the power switch is in the OFF state,
      set the flag to a second state if the second receiver has received the flag set request, and
      control the power switch to disconnect power from the power supply to the information apparatus if the flag is in the second state and the power switch is in the OFF state.

2. An information apparatus to wirelessly communicate with a reading/writing apparatus, the information apparatus comprising:
   a receiver to detect and receive a data request signal transmitted from the reading/writing apparatus;
   a transmitter to transmit a response signal to the reading/writing apparatus in response to the data request signal detected by the receiving part;
   a reader to acquire, from a sensor, detected data indicative of at least one of a physical quantity and a physical state;
   a memory to store the detected data acquired by the reader;
   a power switch having an ON state and an OFF state to selectively connect or disconnect power from a power to the information apparatus;
   a controller to do at least the following,
      start the reader at a desired recurring timing,
      store the detected data acquired by the reader into the memory,
      set a flag to a first state when the detected data is stored into the memory,
      start the receiver according to the desired recurring timing, cause the transmitter to transmit the detected data stored in the memory if the receiver receives a data request signal, invoke an alarm signal if the flag is in the first state and the power switch is in the OFF state, and control the power switch to disconnect power from the power supply to the information apparatus if the flag is in a second state and the power switch is in the OFF state.

3. The information apparatus according to claim 2, wherein the controller is further operable to set the flag to the second state after causing the transmitter to transmit the detected data stored in the memory.

4. The information apparatus according to claim 2, wherein the controller is further operable to set the flag to the second state when the receiver receives a flag set request.

5. The information apparatus according to claim 2, wherein the controller is further operable to cause the transmitter to transmit the detected data stored in the memory only when the receiver detects the data request signal and the flag is in the first state.

6. The information apparatus according to claim 3, wherein the controller is further operable to cause the transmitter to transmit the detected data stored in the memory only when the receiver detects the data request signal and the flag is in the first state.

7. The information apparatus according to claim 4, wherein the controller is further operable to cause the transmitter to transmit the detected data stored in the memory only when the receiver detects the data request signal and the flag is in the first state.

8. A machine-readable recording medium comprising machine-executable instructions for performing a method, execution of which by a machine facilitates functioning as an information apparatus which is communicable with a reading/writing apparatus, the method including:

receiving data transmitted from the reading/writing apparatus;

detecting a data request signal;

transmitting a response signal to the reading/writing apparatus in response to having received the data request signal;

acquiring, from a sensor, detected data indicative of at least one of a physical quantity and a physical state;

storing the acquired detected data into a memory;

performing the acquiring and the obtaining according to a desired recurring timing;

setting a flag to a first state when the detected data is stored into the memory;

transmitting the acquired detected data stored in the memory if the data request signal is detected;

invoking an alarm if the flag is in the first state and the power switch is in the OFF state; and controlling the power switch to disconnect power from the power supply to the information apparatus if the flag is in a second state and the power switch is in the OFF state.

9. A method to facilitate a machine functioning as an information apparatus which is communicable with a reading/writing apparatus, the method comprising:

receiving data transmitted from the reading/writing apparatus;

detecting a data request signal;

transmitting a response signal to the reading/writing apparatus in response to having received the data request signal;

acquiring, from a sensor, detected data indicative of at least one of a physical quantity and a physical state;

storing the acquired detected data into a memory;

setting a flag to a first state when the detected data is stored in the memory;

transmitting the acquired detected data stored in the memory if the data request signal is detected;

setting the flag to a second state when the detected is transmitted;

invoking an alarm if the flag is in the first state and a power switch is in an OFF state; and controlling the power switch to disconnect power from the power supply to the information apparatus if the flag is in the second state and the power switch is in the OFF state.

10. The information accessing system according to claim 1, wherein the alarm signal is communicated in at least one of an audible fashion and a visual fashion.

11. The information apparatus according to claim 2, wherein the alarm signal is communicated in at least one of an audible fashion and a visual fashion.

12. The machine-readable recording medium according to claim 8, wherein the invoking of the alarm includes communicating the alarm in at least one of an audible fashion and a visual fashion.

13. The method according to claim 9, wherein the invoking of the alarm includes communicating the alarm in at least one of an audible fashion and a visual fashion.

14. The information accessing system according to claim 1, wherein the controller is further operable to set the flag to the second state after causing the second transmitter to transmit the detected data stored in the memory.

15. The information accessing system according to claim 1, wherein the controller is further operable to cause the second transmitter to transmit the detected data stored in the memory only when the second receiver detects the data request signal and the flag is in the first state.

16. The machine-readable recording medium according to claim 8, wherein the machine-executed method further includes:

setting the flag to the second state after causing the second transmitter to transmit the detected data stored in the memory.

17. The machine-readable recording medium according to claim 8, wherein the machine-executed method further includes:

transmitting the detected data stored in the memory only when the data request signal is detected and the flag is in the first state.

18. The method according to claim 9, wherein the method further includes:

setting the flag to the second state after causing the second transmitter to transmit the detected data stored in the memory.

19. The method according to claim 8, wherein the method further includes:

transmitting the detected data stored in the memory only when the data request signal is detected and the flag is in the first state.

* * * * *